United States Patent
Maeda et al.

(10) Patent No.: US 8,287,990 B2
(45) Date of Patent: Oct. 16, 2012

(54) RADIO WAVE TRANSMISSION COVER AND METHOD OF MANUFACTURING THE SAME

(75) Inventors: Hideto Maeda, Aichi-ken (JP); Daiichiro Kawashima, Aichi-ken (JP); Kimihiro Iimura, Aichi-ken (JP); Koji Kuno, Aichi-ken (JP); Mamoru Kato, Aichi-ken (JP); Takayasu Ido, Aichi-ken (JP); Muneo Furutani, Aichi-ken (JP); Tetsuya Fujii, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 1068 days.

(21) Appl. No.: 12/076,523

(22) Filed: Mar. 19, 2008

(65) Prior Publication Data

US 2008/0233367 A1    Sep. 25, 2008

(51) Int. Cl.
B32B 3/00 (2006.01)
B05D 5/12 (2006.01)

(52) U.S. Cl. .................. 428/195.1; 428/201; 427/58

(58) Field of Classification Search ............... 428/195.1, 428/201; 427/58
See application file for complete search history.

(56) References Cited

U.S. PATENT DOCUMENTS

| | | | |
|---|---|---|---|
| 6,184,842 B1 * | 2/2001 | Leinweber et al. | 343/872 |
| 6,328,358 B1 | 12/2001 | Berweiler | |
| 6,961,023 B2 | 11/2005 | Fujii et al. | |
| 7,295,166 B2 | 11/2007 | Fujii et al. | |
| 2002/0011946 A1 | 1/2002 | Artis et al. | |
| 2003/0128164 A1 * | 7/2003 | Rahaim et al. | 343/700 MS |
| 2003/0180564 A1 * | 9/2003 | Marquardt | 428/523 |
| 2004/0125023 A1 * | 7/2004 | Fujii et al. | 343/700 MS |
| 2006/0284335 A1 | 12/2006 | Fujii | |

FOREIGN PATENT DOCUMENTS

| | | |
|---|---|---|
| DE | 10 2004 050501 | 2/2006 |
| JP | A-2002-135030 | 5/2002 |
| JP | 2003-202369 | * 7/2003 |
| JP | A-2003-202369 | 7/2003 |
| JP | A-2003-252137 | 9/2003 |
| JP | A-2007-013722 | 1/2007 |

OTHER PUBLICATIONS

Extended European Search Report mailed Dec. 28, 2010 issued in corresponding EP patent application No. EP 08005071.9.

* cited by examiner

*Primary Examiner* — Gerard Higgins
*Assistant Examiner* — Sathavaram I Reddy
(74) *Attorney, Agent, or Firm* — Posz Law Group, PLC

(57) ABSTRACT

The present invention provides a radio wave transmission cover, which is provided in front of a radar device for vehicles, and a method of manufacturing the radio wave transmission cover. In the radio wave transmission cover, cover-side wall surfaces (50) are formed in a second cover layer (35) at positions adjacent to each other. Furthermore, substrate-side wall surfaces (60), which have shapes complementary to the cover-side wall surfaces (50), are formed in a substrate layer (4), which is provided on the rear surface of the second cover layer (35). The cover-side wall surfaces (50) and the corresponding substrate-side wall surfaces (60) are engaged to each other.

16 Claims, 8 Drawing Sheets

RADIO WAVE TRANSMISSION COVER AND METHOD OF MANUFACTURING THE SAME

INCORPORATION BY REFERENCE

This disclosure of Japanese Patent Application No. JP 2007-75213 filed on Mar. 22, 2007, and Japanese Patent Application No. JP 2007-251504 filed on Sep. 27, 2007, including the specification, drawings, and abstract, is incorporated by reference in its entirety.

BACKGROUND OF THE INVENTION

1. Field of the Invention

The present invention relates to a radio wave transmission cover, which is provided in front of a radar device for vehicles, and a method of manufacturing the radio wave transmission cover.

2. Description of the Related Art

Auto cruise systems are techniques, which measure the distance or a relative speed between a subject vehicle and a preceding vehicle, which is in front of the subject vehicle, using a sensor provided in the front end of the subject vehicle, and control a throttle or brake depending on the resultant data to accelerate or decelerate the subject vehicle, thus controlling a vehicle-to-vehicle distance. Recently, such auto cruise systems have attracted considerable attention as a core technique for constructing an intelligent transportation system (ITS), which aims to reduce the incidence of traffic jams and accidents.

Typically, laser radar or millimeter wave radar is used as the sensor for auto cruise systems. For example, millimeter wave radar transmits a millimeter wave, which has a frequency ranging from 30 GHz to 300 GHz and a wavelength ranging from 1 mm to 10 mm, to an object, and receives the millimeter wave, which has been reflected by the object. From this principle, the millimeter wave radar measures the distance or the relative speed between a subject vehicle and a preceding vehicle using the difference between the transmitted wave and the received wave.

Generally, radar devices for vehicles are disposed behind front grills of the vehicles. Such a front grill is uneven in thickness and is made of metal, or has metal-plated layers on the surfaces thereof, thus interfering the transmission of radio waves. To overcome this problem, a technique in which a window part is provided in the front grill at a position corresponding to the front end of the radar device and a radio wave transmission cover made of resin is inserted into the window part has been proposed.

The radio wave transmission cover typically has a design layer for expressing various designs. The design layer is a relatively thin layer, which is formed through vapor deposition of metal or transferring of a film. Hence, it is required to cover each of the front surface and the rear surface of the thin design layer with a reinforcing resin layer.

To manufacture the radio wave transmission cover, which is configured by covering the front and rear surfaces of the design layer with respective reinforcing resin layers, a first reinforcing resin layer is first formed, thereafter, the design layer is formed on the upper surface of the first reinforcing resin layer through vapor deposition or transfer. Subsequently, a second reinforcing resin layer is formed on the upper surface of the design layer, thus completing the manufacture of the radio wave transmission cover.

Here, to ensure a superior design of the radio wave transmission cover, the material (hereinafter, referred to as a first resin material) of the first resin layer, which is formed first, must have a melting point higher than that of the material (hereinafter, referred to as a second resin material) of the second resin layer, which is formed later. That is, in the case where the melting point of the first resin material is higher than that of the second resin material, the first resin layer, which is formed first, is prevented from being melted by the heat of the molten second resin layer. Thus, the design layer, which is formed on the upper surface of the first resin layer, is prevented from being deformed, and a radio wave transmission cover having a superior design can be produced. If the melting point of the second resin material is equal to or higher than the melting point of the first resin material, the first resin layer may be melted by the heat of the molten second resin material. Furthermore, when the first resin layer is melted, the design layer formed on the first resin layer is deformed. Therefore, in this case, it is impossible to ensure a superior design of the radio wave transmission cover.

Meanwhile, in the case where the melting point of the first resin material is higher than that of the second resin material, the compatibility between the two resin layers is reduced, with the result that it is difficult to firmly integrate the two resin layers with each other. In an effort to overcome this problem, techniques for mechanically engaging the two resin layers to each other have been proposed. (For an example, refer to Japanese Laid Open Patent Publication NO. 2000-159039).

In the radio wave transmission cover proposed in Japanese Laid Open Patent Publication No. 2000-159039, front and rear surfaces of a design layer, which is formed through the vapor deposition of indium, are covered with respective reinforcing resin layers. In detail, the front surface of the design layer is covered with a resin layer (referred to as a cover layer), which is made of transparent resin. The rear surface of the design layer is covered with another resin layer (referred to as a substrate layer), which is made of opaque resin. Furthermore, a further resin layer (referred to as a mask layer), which is made of opaque resin, is interposed between the cover layer and the design layer. The mask layer covers part of the rear surface of the cover layer. An engaging part having an undercut shape is formed on the circumferential outer edge of the cover layer.

In the radio wave transmission cover proposed in Japanese Laid Open Patent Publication No. 2000-159039, the engaging part, which is provided on the circumferential outer edge of the cover layer, is engaged to the rear surface of the circumferential outer edge of the substrate layer. Thereby, the cover layer is mechanically fastened to the substrate layer. Therefore, even though the cover layer and the substrate layer are made of materials having different melting points, the cover layer and the substrate layer can be firmly integrated with each other. Furthermore, in the radio wave transmission cover of Japanese Laid Open Patent Publication NO. 2000-159039, the design layer is visible to the front side (a cover layerside) of the radio wave transmission cover through a part (hereinafter, referred to as a window part) of the cover layer that is not covered with the mask layer. Therefore, the design of the design layer of the radio wave transmission cover is expressed in a shape corresponding to the shape of the window part.

However, in the case where the resin material of the cover layer differs from that of the substrate layer, the relative positions of the cover layer and the substrate layer may be displaced from the correct positions by the difference in contraction ratios between the cover layer and the substrate layer. In this case, although the cover layer is mechanically fastened to the substrate layer using the technique proposed in Japanese Laid Open Patent Publication NO. 2000-159039, in portions of the radio wave transmission cover other than the engaging part, the cover layer may be separated from the substrate layer. If the cover layer is partially separated from the substrate layer, gaps (air layers) are formed between the cover layer and the substrate layer, thus deteriorating the radio wave transmissibility of the radio wave transmission cover.

Furthermore, a variety of designs has been required lately in the radio wave transmission cover, but there is a limit to the design of the radio wave transmission cover of Japanese Laid Open Patent Publication No. 2000-159039. That is, because the mask layer of the radio wave transmission cover of Japanese Laid Open Patent Publication No. 2000-159039 covers only portions of the rear surface of the cover layer, the mask layer must be formed through molding or printing. However, the radio wave transmission cover of Japanese Laid Open Patent Publication No. 2000-159039 includes the engaging part having the undercut shape, and thus the mask layer cannot be formed on the engaging part or the surrounding area. Therefore, the conventional technique, proposed in Japanese Laid Open Patent Publication No. 2000-1590.39, is problematic in that a superior design of the radio wave transmission cover and a high degree of freedom in designing it cannot be ensured.

SUMMARY OF THE INVENTION

Accordingly, the present invention has been made keeping in mind the above problems occurring in the prior art, and an object of the present invention is to provide a radio wave transmission cover, which can prevent a substrate layer from being separated from a cover layer, and a method of manufacturing the radio wave transmission cover. Another object of the present invention is to provide a radio wave transmission cover which has a superior design and has a high degree of freedom in designing it.

In a first aspect, the present invention provides a radio wave transmission cover provided in front of a radar device for vehicles, comprising: a design layer; a cover layer for covering the front surface of the design layer, the cover layer having a plate shape; and a substrate layer for covering the rear surface of the design layer, the substrate layer having a plate shape. In the radio wave transmission cover, the cover layer comprises a first cover layer made of a transparent resin material, and a second cover layer for covering a portion of the first cover layer, the second cover layer being made of a mixture of the transparent resin material and a colorant, the first cover layer and the second cover layer being formed in multiple colors; the second cover layer comprises a plurality of engaging projection parts each of which has a plurality of cover-side wall surfaces extending in directions crossing the rear surface of the second cover layer; the substrate layer is made of a resin material having a melting point different from the melting point of the transparent resin material and comprises a plurality of engaging depression parts, each of which has a plurality of substrate-side wall surfaces having shapes complementary to the corresponding cover-side wall surfaces; and the engaging projection parts are engaged to the corresponding engaging depression parts.

Preferably, the radio wave transmission cover according to the first aspect includes at least one of the following (1) through (6).

(1) the shortest distance between the cover-side wall surfaces is 0.5 mm or less.

(2) at least a portion of at least one of the plurality of cover-side wall surfaces extends in a direction crossing a thicknesswise direction of the substrate layer.

(3) at least one of the plurality of cover-side wall surfaces extends both in a first direction, crossing the rear surface of the second cover layer, and in a second direction, crossing the first direction; and at least another one of the plurality of cover-side wall surfaces extends both in the first direction and in a third direction, crossing the second direction.

(4) at least one end of each of the substrate layer and the second cover layer is longer than remaining ends thereof; and at least one of the plurality of cover-side wall surfaces extends both in the first direction, crossing the rear surface of the second cover layer, and in a fourth direction, crossing at least one of a lengthwise direction of the substrate layer and a lengthwise direction of the second cover layer.

(5) each of the engaging projection parts has an undercut shape; and the second cover layer comprises a planar part disposed adjacent to the rear surface of the first cover layer, the planar part having a rear surface, from which the engaging projection parts protrude.

(6) the second cover layer is formed on the first cover layer; a window part is formed by a portion of the rear surface of the first cover layer other than a remaining portion covered with the second cover layer, the window part having a parting part at a boundary between the window part and the second cover layer, the parting part having a wall shape; and a tip part of the parting part protrudes from a portion of the second cover layer that is adjacent to the parting part in a rearward direction.

In a second aspect, the present invention provides a radio wave transmission cover provided in front of a radar device for vehicles, comprising: a design layer; a cover layer for covering the front surface of the design layer; and a substrate layer for covering the rear surface of the design layer. In the radio wave transmission cover, the cover layer comprises a first cover layer made of a transparent resin material, and a second cover layer for covering a portion of the first cover layer, the second cover layer being made of a mixture of the transparent resin material and a colorant, the first cover layer and the second cover layer being formed in multiple colors; the second cover layer comprises a planar part disposed adjacent to the rear surface of the first cover layer, and a cover-side engaging part protruding from a rear surface of the planar part, the cover-side engaging part having an undercut shape; and the substrate layer is made of a resin material having a melting point different from the melting point of the transparent resin material and comprises a substrate-side engaging part engaged to the cover-side engaging part.

Preferably, the radio wave transmission cover according to the second aspect has the following (7).

(7) the second cover layer is formed on the first cover layer; a window part is formed by a portion of the rear surface of the first cover layer other than a remaining portion covered with the second cover layer, the window part having a parting part at a boundary between the window part and the second cover layer, the parting part having a wall shape; and a tip part of the parting part protrudes from a portion of the second cover layer that is adjacent to the parting part in a rearward direction.

The method of manufacturing a radio wave transmission cover according to the present invention is a method of manufacturing the radio wave transmission cover according to the first aspect including the above mentioned (2). The method comprises: forming an intermediate having the cover layer and the design layer; and forming the substrate layer by applying a molten resin material for the substrate layer onto the rear surface of the intermediate, wherein in the forming the substrate layer, at least one of the cover-side wall surfaces is bent by the flow pressure of the resin material of the substrate layer.

Preferably, the method of manufacturing the radio wave transmission cover according to the present invention has the following (8).

(8) the softening temperature of the transparent resin material is lower than the melting temperature of the resin material of the substrate layer; and in the forming of the substrate layer, at least one of the cover-side wall surfaces is bent, as at least part of the second cover layer is softened.

In the radio wave transmission cover according to the first aspect, the cover layer includes the first cover layer and the second cover layer. Because the first cover layer and the second cover layer are made of identical transparent resin, they are compatible with and are thus firmly integrated with each other. Furthermore, because the cover-side wall surfaces of the second cover layer and the substrate-side wall surfaces of the substrate layer are engaged to each other, the second cover layer and the substrate layer are mechanically integrated with each other. In addition, there are several cover-side wall surfaces, and these cover-side wall surfaces are adjacent to each other. Thus, there is a plurality of engaging positions at which the cover-side wall surfaces are engaged to the corresponding substrate-side wall surfaces. The engaging positions are adjacent to each other. Therefore, the cover layer and the substrate layer can be firmly integrated with each other. As a result, the radio wave transmission cover according to the first aspect can prevent the relative positions between the cover layer and the substrate layer from being displaced from the correct positions, and can prevent the cover layer and the substrate layer from being separated from each other.

In the radio wave transmission cover according to the first aspect including the above mentioned (1), the shortest distance between the adjacent cover-side wall surfaces is relatively short. Thus, the engaging positions between the cover-side wall surface and the substrate-side wall surface are adjacent to each other, so that the cover layer and the substrate layer are more firmly integrated with each other. Therefore, the radio wave transmission cover according to the first aspect including the above mentioned (1) can more reliably prevent the relative positions of the cover layer and the substrate layer from being displaced from the correct positions.

In the radio wave transmission cover according to the first aspect including the above mentioned (2), at least a portion of at least one of the cover-side wall surfaces extends in the direction crossing the thicknesswise direction of the substrate layer. Thus, at least one cover-side wall surface has an undercut shape with respect to the thicknesswise direction of the substrate layer. Hence, each substrate-side wall surface, which has a shape complementary to the cover-side wall surface, also has an undercut shape with respect to the thickness wise direction of the substrate layer. Therefore, the cover-side wall surfaces and the substrate-side wall surfaces can be firmly engaged to each other with respect to the thickness wise direction of the substrate layer. As a result, the radio wave transmission cover according to the first aspect including the above mentioned (2) can more reliably prevent the cover layer and the substrate layer from being separated from each other.

In the radio wave transmission cover according to the first aspect including the above mentioned (3), because at least one cover-side wall surface extends in a direction crossing at least another cover-side wall surface, the cover-side wall surfaces and the substrate-side wall surfaces can be engaged to each other in at least two directions, such that the direction in which some cover-side wall surfaces are engaged to the corresponding substrate-side wall surfaces is different from the direction in which the remaining cover-side wall surfaces are engaged to the corresponding substrate-side wall surfaces. Therefore, the relative positions between the cover layer and the substrate layer are prevented from being displaced from the correct positions in two directions. As a result, the radio wave transmission cover according to the first aspect including the above mentioned (3) can more reliably prevent the cover layer and the substrate layer from being separated from each other.

Here, in the case where the substrate layer has a shape such that at least one end thereof is longer than the remaining ends thereof (for example, in the case where the substrate layer has an elliptical plate shape or a rectangular plate shape), the amount that the substrate layer is contracted in the lengthwise direction is greater than the amount that the substrate layer is contracted in other directions. With regard to the second cover layer, the same phenomenon is present. Therefore, the relative positions of the second cover layer and the substrate layer may be displaced largely from the correct positions in at least one direction of the lengthwise directions of the substrate layer and the second cover layer. In the radio wave transmission cover according to the first aspect including the above mentioned (4), at least one of the cover-side wall surfaces extends in the direction crossing at least one of the lengthwise direction of the second cover layer and the lengthwise direction of the substrate layer. Therefore, the relative positions of the second cover layer and the substrate layer are effectively prevented from being displaced from the correct positions in the direction in which the contracted length thereof is relatively large. As a result, the radio wave transmission cover according to the first aspect including the above mentioned (4) can more reliably prevent the cover layer and the substrate layer from being separated from each other.

In the radio wave transmission cover according to the first aspect including the above mentioned (5), the engaging projection parts of the cover-side formed on the cover layer are engaged to the corresponding engaging depression parts of the substrate-side formed in the substrate layer. Thus, the cover layer and the substrate layer are firmly engaged to each other. Hence, in the radio wave transmission cover of the present invention, because the substrate layer and the cover layer are made of materials having different melting points, the design layer can be prevented from being deformed. In other words, the radio wave transmission cover of the present invention ensures a superior design.

Furthermore, the second cover layer constituting the cover layer includes a colorant. The engaging projection parts of the cover-side are formed on the second cover layer. Hence, the engaging projection parts of the cover-side and the periphery (that is, the second cover layer) thereof can serve as a mask layer. Accordingly, the design of the radio wave transmission cover of the present invention is prevented from being limited to any particular shape due to the engaging parts, and can ensure a high degree of freedom in design.

As well, the second cover layer is made of a mixture of the colorant and the transparent resin material that is identical to the material of the first cover layer. The first cover layer and the second cover layer are formed in multiple colors. Therefore, the first cover layer and the second cover layer are partially compatible with each other and are firmly integrated with each other.

The radio wave transmission cover according to the first aspect including the above mentioned (5) and (6) can ensure a more superior design. The reason for this is as follows.

Because the first cover layer and the second cover layer are made of resin, they are contracted after they are formed. Due to this contraction, a boundary line between the window part of the first cover layer and the second cover layer may be displaced from the desired position. Therefore, it is very difficult to form the boundary line at the correct position.

In the radio wave transmission cover according to the first aspect including the above mentioned (5) and (6), the parting part is formed at the boundary between the window part and the second cover layer. The parting part has a wall shape and protrudes from the second cover layer in a rearward direction. Therefore, in the case where the second cover layer is formed on the first cover layer (that is, in the case where the first cover layer is first formed and the second cover layer is subsequently formed), the parting part is brought into close contact with the mold surface of a mold under pressure and is thus reliably supported by the mold. As such, because the parting part is reliably supported, even though the first cover layer is contracted after it is formed, the boundary line between the window part of the first cover layer and the second cover layer is prevented from being displaced from the correct position. Hence, the radio wave transmission cover according to the first aspect including the abovementioned (5) and (6) can ensure a superior design.

In the radio wave transmission cover according to the second aspect, the cover-side engaging part formed on the cover layer is engaged to the substrate-side engaging part formed on the substrate layer. Thus, the cover layer and the substrate layer are firmly integrated with each other. Therefore, in the radio wave transmission cover according to the second aspect, because the substrate layer and the cover layer are made of materials having different melting points, the design layer is prevented from being deformed. That is, the radio wave transmission cover of the present invention ensures a superior design.

Furthermore, the second cover layer, constituting the cover layer, includes a colorant. The cover-side engaging part is formed on the second cover layer. Hence, the cover-side engaging part and the periphery (that is, the second cover layer) thereof can serve as a mask layer. Accordingly, the design of the radio wave transmission cover according to the second aspect is not limited to any particular shape by the engaging part, and can ensure a high degree of freedom in design.

In addition, the second cover layer is made of a mixture of the colorant and the transparent resin material that is identical to the material of the first cover layer. The first cover layer and the second cover layer are formed in multiple colors. Therefore, the first cover layer and the second cover layer are partially compatible with each other and are firmly integrated with each other.

The radio wave transmission cover according to the second aspect including the above mentioned (7). The reason for this is as follows.

Because the first cover layer and the second cover layer are made of resin, they are contracted after having being formed. Due to this contraction, the boundary line between the window part of the first cover layer and the second cover layer may be displaced from the desired position. Therefore, it is very difficult to form the boundary line at the correct position.

In the radio wave transmission cover according to the second aspect including the above mentioned (7), the parting part is formed at the boundary between the window part and the second cover layer. The parting part has a wall shape and protrudes from the second cover layer in a rearward direction. Therefore, in the case where the second cover layer is formed on the first cover layer (that is, in the case where the first cover layer is formed first and the second cover layer is subsequently formed), the parting part is brought into close contact with a mold surface of a mold under pressure, and is thus reliably supported by the mold. As such, because the parting part is reliably supported, even though the first cover layer is contracted after having being formed, the boundary line between the window part of the first cover layer and the second cover layer is prevented from being displaced from the correct position. Hence, the radio wave transmission cover according to the second aspect including the above mentioned (7) can ensure a more superior design.

Meanwhile, in the method of manufacturing the radio wave transmission cover according to the present invention (in other words, in the method of manufacturing the radio wave transmission cover according to the first aspect including the above mentioned (2) according to the present invention), because at least a portion of each cover-side wall surface is bent by the flow pressure of the resin material of the substrate layer, the cover-side wall surface, having an undercut shape with respect to the thicknesswise direction of the substrate layer, can be easily and inexpensively formed. Therefore, according to the method of manufacturing the radio wave transmission cover of the present invention, the radio wave transmission cover of the present invention including the above mentioned (2) can be easily and inexpensively manufactured.

In the method of manufacturing the radio wave transmission cover of the present invention including the above mentioned (8), in the process of forming the substrate layer, at least part of the second cover layer is softened. Thus, the cover-side wall surfaces can be easily and reliably bent. Therefore, according to the method of manufacturing the radio wave transmission cover of the present invention including the above mentioned (8), the radio wave transmission cover according to the first aspect including the above mentioned (2) can be easily and reliably manufactured.

BRIEF DESCRIPTION OF THE DRAWINGS

The above and other objects and features of the present invention will become apparent from the following description of specified embodiment, given in conjunction with the accompanying drawings, in which.

DESCRIPTION OF THE SPECIFIC EMBODIMENTS

Figure 1:
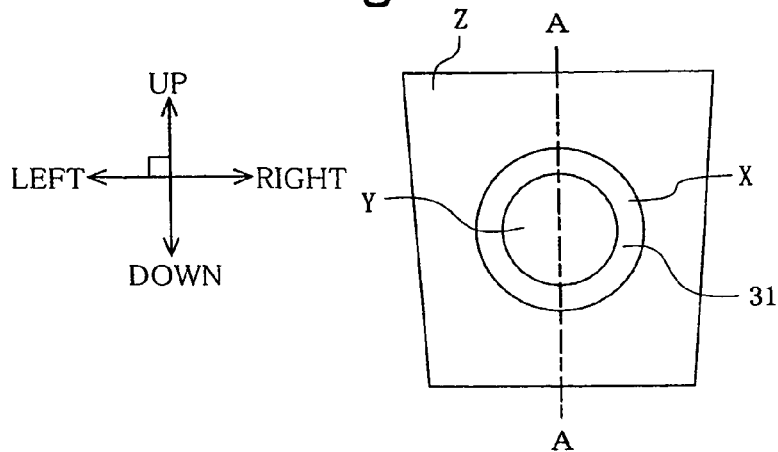
FIG. 1 is a front view schematically showing a radio wave transmission cover, according to a first embodiment of the present invention.

Various embodiments of the present invention will now be described in detail with reference to the accompanying drawings.

A first cover layer is disposed in the frontmost surface of the radio wave transmission cover of the present invention. Therefore, it is preferable that the first cover layer be made of transparent resin, having superior weather resistance. Polycarbonate resin and acryl resin are representative examples of transparent resin having superior weather resistance.

A second cover layer is made of a mixture of the same transparent resin as that of the first cover layer and a colorant. The colorant is appropriately selected depending on the design of the radio wave transmission cover. For example, a black colorant, such as carbon black, may be used as the colorant, or other colorants may be used. Furthermore, one kind of colorant may be used, or, alternatively, a mixture of several kinds of colorants may be used.

In the radio wave transmission cover of the present invention, a substrate layer is made of resin (hereinafter, referred to as 'resin for the substrate') having a melting point different from that of the transparent resin used as the material of the first cover layer and the second cover layer. For example, in the case where the substrate layer is formed behind the cover layer, resin material having a melting point lower than that of the transparent resin is preferably used as the resin for the substrate. In contrast, in the case where the cover layer is formed behind the substrate layer, resin material having a melting point higher than that of the transparent resin is preferably used as the resin for the substrate. Furthermore, in the case where polycarbonate resin is used as the transparent resin, AES resin is preferably used as the resin for the substrate. The reason for this is that AES resin has almost the same permittivity as that of polycarbonate resin, so that radio waves can evenly propagate through it.

In the radio wave transmission cover of the present invention, the design layer may be formed on the cover layer or, alternatively, it may be formed on the substrate layer. For example, in the case where the cover layer is formed before forming the substrate layer, it is preferable that the design layer be formed on the rear surface of the cover layer. In contrast, in the case where the substrate layer is formed before forming the cover layer, it is preferable that the design layer be formed on the front surface of the substrate layer. The design layer may be formed by vapor-depositing metal such as indium onto the cover layer or the substrate layer. Alternatively, the design layer may be formed on the cover layer or the substrate layer by screen-printing. As a further alternative, the design layer may be formed by transferring a design, which is printed on a transfer film in a predetermined shape, onto the cover layer or the substrate layer. Furthermore, a design layer, which is formed by vapor-depositing or printing a predetermined design onto a film, may be laminated on the cover layer or the substrate layer. The design layer may be made using a single kind of material or, alternatively, using several kinds of materials. In addition, the design layer may have a single layer, or, alternatively, it may have several layers. For example, a sheet, which is made by adhering a flaky film, on which a second design is formed by vapor deposition, to a resin film, on which a first design is printed, may be used as the design layer. Moreover, a protective layer made of acryl coating material or the like may be formed on the upper surface of the design layer.

In the radio wave transmission cover of the present invention, preferably, the shortest distance between adjacent cover-side wall surfaces is 15 mm or less. When the shortest distance between adjacent cover-side wall surfaces is 15 mm or less, engaging positions, at which the cover-side wall surfaces are engaged to the corresponding substrate-side wall surfaces, can be adjacent to each other, so that the cover layer and the substrate layer can be firmly integrated with each other. Preferably, the shortest distance between adjacent cover-side wall surfaces is 7.5 mm or less, and, more preferably, it ranges from 0.2 mm to 2 mm.

In the method of manufacturing the radio wave transmission cover according to the present invention, the cover layer is first formed, and then the substrate layer is formed. Therefore, the design layer is formed on the rear surface of the cover layer. Furthermore, resin having a melting point less than that of transparent resin is used as resin for the substrate.

Hereinafter, the radio wave transmission cover according to the present invention will be described with reference to the attached drawings.

First Embodiment

Figure 2:
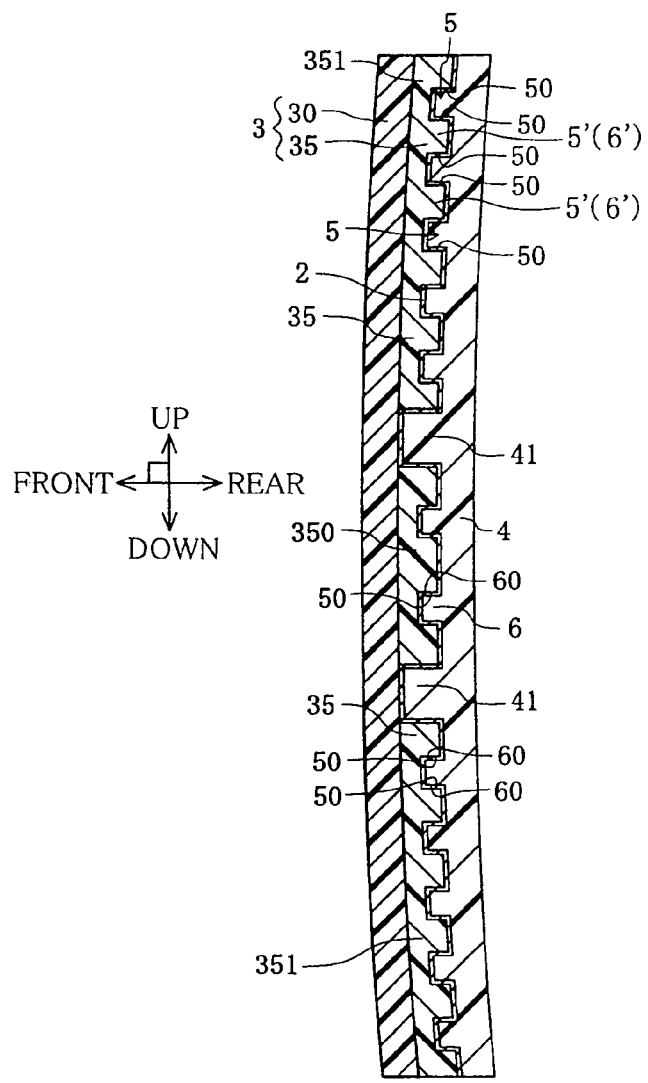
FIG. 2 is a sectional view taken along the line A-A of FIG. 1, showing the radio wave transmission cover according to the first embodiment of the present invention.
Figure 3:
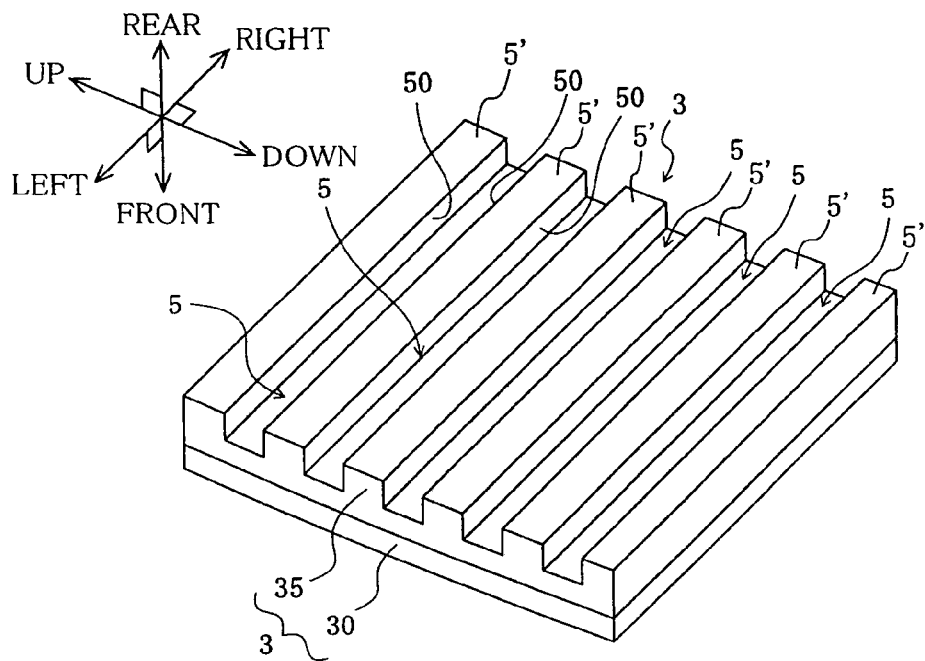
FIG. 3 is an enlarged perspective view illustrating a main part of a cover layer of the radio wave transmission cover according to the first embodiment.
Figure 4:
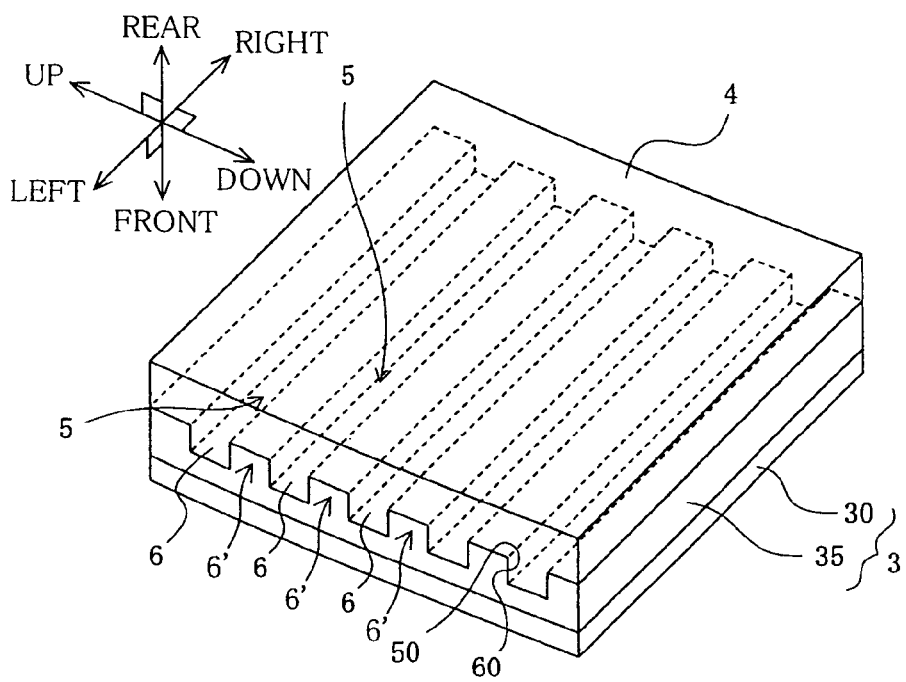
FIG. 4 is an enlarged perspective view illustrating a main part of the radio wave transmission cover according to the first embodiment.

A radio wave transmission cover according to a first embodiment of the present invention is fitted into an opening, which is formed in the front grill of a vehicle. A millimeter wave radar device for vehicles is installed behind the radio wave transmission cover of the first embodiment. The radio wave transmission cover according to the first embodiment includes above mentioned (1) and (4). FIG. 1 is a front view schematically showing the radio wave transmission cover according to the first embodiment. FIG. 2 is a sectional view taken along the line A-A of FIG. 1, showing the radio wave transmission cover according to the first embodiment. FIG. 3 is an enlarged perspective view illustrating a main part of a cover layer of the radio wave transmission cover according to the first embodiment. FIG. 4 is an enlarged perspective view illustrating a main part of the radio wave transmission cover according to the first embodiment. Hereinafter, in the first embodiment, the terms up, down, left, right, front and rear respectively are defined by up, down, left, right, front and rear shown in FIGS. 1 to 4.

As shown in FIG. 2, the radio wave transmission cover according to the first embodiment includes a design layer 2, a cover layer 3 and a substrate layer 4.

The cover layer 3 covers the front surface of the design layer 2. The cover layer 3 includes a first cover layer 30 and a second cover layer 35, which are formed in various colors.

The first cover layer 30 is made of polycarbonate resin, which is a kind of transparent resin, thus being transparent. A portion of the rear surface of the first cover layer 30 is depressed to have a ring shape. The interior of the ring-shaped depressed portion is called a window part 31.

The second cover layer 35 is made of a mixture of polycarbonate resin and carbon black, and is black. On the rear surface of the first cover layer 30, the second cover layer 35 is formed inside the inner circumference of the window part 31 and outside the outer circumference of the window part 31. In other words, the second cover layer 35 covers portions of the rear surface of the first cover layer 30 other than the window part 31. The portion of the second cover layer 35 that covers the portion of the rear surface of the first cover layer 30, which is disposed inside the inner circumference of the window part 31, is designated an inside second cover layer 350. The portion of the second cover layer 35 that covers the portion of the rear surface of the first cover layer 30, which is disposed outside the outer circumference of the window part 31, is designated an outside second cover layer 351.

The design layer 2 is formed by vapor-depositing indium on the rear surface of the cover layer 3. As shown in FIG. 2, the design layer 2 covers both the rear surface of the second cover layer 35 and the inner surface of the window part 31 of the first cover layer 30.

The substrate layer 4 covers the rear surface of the design layer 2. The substrate layer 4 is made of AES resin. The melting point of AES resin is lower than that of polycarbonate resin. The substrate layer 4 covers the entire rear surface of the cover layer 3 in the state in which the design layer 2 is interposed between the substrate layer 4 and the cover layer 3. In the substrate layer 4, a portion, which is disposed behind the window part 31, forms a ring-shaped window charging part 41, which forms a protrusion structure. The window charging part 41 is inserted into the window part 31 in a state in which the design layer 2 is interposed therebetween.

As shown in FIG. 1, the radio wave transmission cover according to the first embodiment has a rectangular plate shape, in which the length in the upward and downward directions is greater than the length in the leftward and rightward directions. The substrate layer 4 also has a rectangular plate shape, in which the length in the upward and downward directions is greater than the length in the leftward and rightward directions.

As shown in 2 and 3, the second cover layer 35 has a plurality of depressions 5, which are depressed towards the first cover layer 30 and extend predetermined lengths in the leftward and rightward directions. An engaging projection part 5', which protrudes towards the substrate layer 4 and extends a predetermined length in the leftward and rightward directions, is formed between adjacent depressions 5. The depressions 5 are adjacent to each other. In the radio wave transmission cover according to the first embodiment, cover-side wall surfaces 50 are defined in each depression 5 by the sidewalls of the corresponding engaging projection parts 5'. As shown in FIG. 3, each of the depressions 5 and the engaging projection parts 5' extends in the frontward and rearward directions and in the leftward and rightward directions. The frontward and rearward directions are the directions crossing the rear surface of the second cover layer 350, and correspond to the first direction in the present invention. The leftward and rightward directions are the directions crossing the lengthwise direction of the front surface of the substrate layer 4, and correspond to the fourth direction in the present invention. Thus, each cover-side wall surface 50 extends in the first and fourth directions. In the radio wave transmission cover according to the first embodiment, the shortest distance between adjacent cover-side wall surfaces 50 is approximately 0.5 mm.

As shown in FIGS. 2 and 4, the substrate layer 4 has a plurality of protrusions 6, which protrude towards the second cover layer 35. An engaging depressed part 6', which is depressed towards the rear surface of the substrate layer 4 and extends in the leftward and rightward directions, is defined between the adjacent protrusions 6. In the radio wave transmission cover of the first embodiment, substrate-side wall surfaces 60 are defined in each engaging depressed part 6' by the sidewalls of the corresponding protrusions 6. Each protrusion 6 has a shape complementary to that of the corresponding depression 5, and is inserted into the depression 5. In the same manner, each engaging depressed part 6' has a shape complementary to that of the corresponding engaging projection part 5', and receives the engaging projection part 5' therein. Thereby, the substrate-side wall surfaces 60 are engaged to the corresponding cover-side wall surfaces 50.

Below, a method of manufacturing the radio wave transmission cover according to the first embodiment will be explained.

(Process of Forming Intermediate: 1. Process of Forming Cover Layer)

A first mold (not shown) for forming the front surface of the first cover layer 30, a second mold (not shown) for forming the rear surface of the first cover layer 30, and a third mold (not shown) for forming the rear surface of the second cover layer 35 are prepared. Thereafter, the second mold is engaged to the first mold such that a first cavity is defined between the mold surface of the first mold and the mold surface of the second mold. Molten polycarbonate resin is injected into the first cavity, thus forming the first cover layer 30. After the first cover layer 30 has been formed, the second mold is replaced with the third mold. Then, a second cavity is defined between the mold surface of the first mold, the rear surface of the first cover layer 30, which remains in the first mold, and the mold surface of the third mold. A molten mixture of molten polycarbonate resin and carbon black is injected into the second cavity, thus forming the second cover layer 35 on the rear surface of the first cover layer 30. Through this cover layer forming process, the cover layer 3, which is formed by forming the first cover layer 30 and the second cover layer 35 in multiple colors (in the first embodiment, in two colors), is obtained.

(Process of Forming Intermediate: 2. Process of Forming Design Layer)

The front surface and the side surface of the cover layer 3, which is formed through the cover layer forming process, are masked. Thereafter, indium is vapor-deposited onto the rear surface of the cover layer 3, thus forming the design layer 2. Then, an intermediate of the radio wave transmission cover, which includes the cover layer 3 and the design layer 2, is obtained by completing the design layer forming process.

(Process of Forming Substrate Layer)

A fourth mold (not shown) for forming the rear surface of the substrate layer 4 is prepared. The intermediate (not shown), which is obtained by completing the design layer forming process, is placed in the first mold. Thereafter, the fourth mold is engaged to the first mold such that a third cavity is defined between the mold surface of the first mold, the rear surface of the intermediate, which is placed in the first mold, and a mold surface of the fourth mold. Subsequently, molten AES resin is injected into the third cavity, thus forming the substrate layer 4 on the rear surface of the design layer 2. Then, the radio wave transmission cover, which includes the cover layer 3, the design layer 2, and the substrate layer 4, is obtained through the above-mentioned processes.

As shown in FIG. 1, when seen in the front view of the radio wave transmission cover of the first embodiment, the color of the metal which is derived from the design layer 2 is expressed through the interior X of the window part 31. The portion Y inside the inner circumference of the window part 31 and the portion Z outside the outer circumference thereof are expressed in black, derived from the second cover layer 35. Because the second cover layer 35 is colored (black), the cover-side wall surfaces 50 of the second cover layer 35 and the substrate-side wall surfaces 60 of the substrate layer 4 are invisible when observing the radio wave transmission cover in the direction towards the front surface thereof. Therefore, the radio wave transmission cover of the first embodiment ensures a superior design.

Furthermore, the main material of the second cover layer 35 is the same transparent resin as that of the first cover layer 30, and the first cover layer 30 and the second cover layer 35 are formed in multiple colors. Therefore, the first cover layer 30 and the second cover layer 35 are partially compatible with each other. As a result, the first cover layer 30 and the second cover layer 35 can be firmly integrated with each other.

In addition, because the cover-side wall surfaces 50 of the second cover layer 35 and the substrate-side wall surfaces 60 of the substrate layer 4 are engaged to each other, the second cover layer 35 and the substrate layer 4 are mechanically integrated with each other. Here, there are many cover-side wall surfaces 50 and many substrate-side wall surfaces 60, the cover-side wall surfaces 50 are adjacent to each other, and the substrate-side wall surfaces 60 are also adjacent to each other. Therefore, the cover-side wall surfaces 50 and the substrate-side wall surfaces 60 are engaged to each other at many positions, and the engaging positions between the cover-side wall surfaces 50 and the substrate-side wall surfaces 60 are adjacent to each other. Hence, the cover layer 3 can be firmly integrated with the substrate layer 4, and the relative positions between the cover layer 3 and the substrate layer 4 are prevented from being displaced from the correct positions. As well, because the shortest distance between adjacent cover-side wall surfaces 50 and the shortest distance between adjacent substrate-side wall surfaces 60 are very short, the relative positions of the cover layer 3 and the substrate layer 4 can be reliably prevented from being displaced from the correct positions. As a result, in the radio wave transmission cover of the first embodiment, the cover layer 3 can be prevented from being undesirably separated from the substrate layer 4.

Meanwhile, in the radio wave transmission cover of the first embodiment, the length in the upward and downward directions of the substrate layer 4 is greater than the length in the leftward and rightward directions. Thus, the substrate layer 4 is contracted a relatively large distance in the upward and downward directions (in the lengthwise direction). Therefore, there may be the possibility of misalignment of the relative positions between the second cover layer 35 and the substrate layer 4 in the upward and downward directions. However, in the radio wave transmission cover of the first embodiment, the cover-side wall surfaces 50 extend in the leftward and rightward directions, and the substrate-side wall surfaces 60 also extend in the leftward and rightward directions. Accordingly, the cover-side wall surfaces 50 are engaged to the corresponding substrate-side wall surfaces 60 in the upward and downward directions, so that misalignment of the relative positions between the second cover layer 35 and the substrate layer 4 in the upward and downward directions can be effectively prevented. Hence, the radio wave transmission cover of the first embodiment realizes the structure such that the cover layer 3 can be more reliably prevented from being separated from the substrate layer 4.

Furthermore, in the radio wave transmission cover according to the first embodiment, although the inside second cover layer 350 and the outside second cover layer 351 have been illustrated as being made using the same mixture material, they may be made using mixture materials that differ from each other. For example, the inside second cover layer 350 may be made of a mixture of polycarbonate resin and some colorant other than carbon black. In this case, the inside second cover layer 350 can be formed in a color different from that of the outside second cover layer 351.

Second Embodiment

Figure 5:
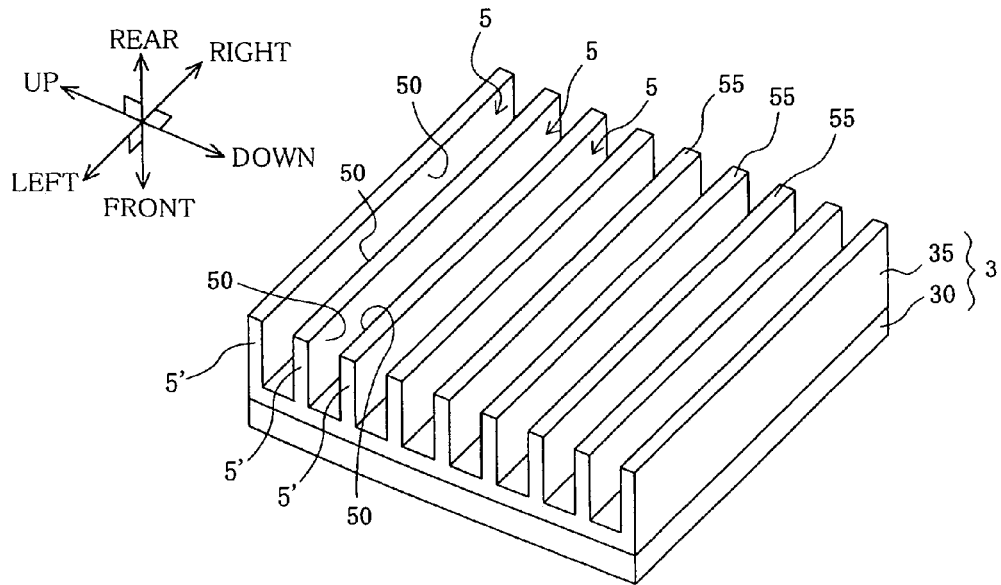
FIG. 5 is a view illustrating a process of manufacturing a radio wave transmission cover, according to a second embodiment of the present invention.
Figure 6:
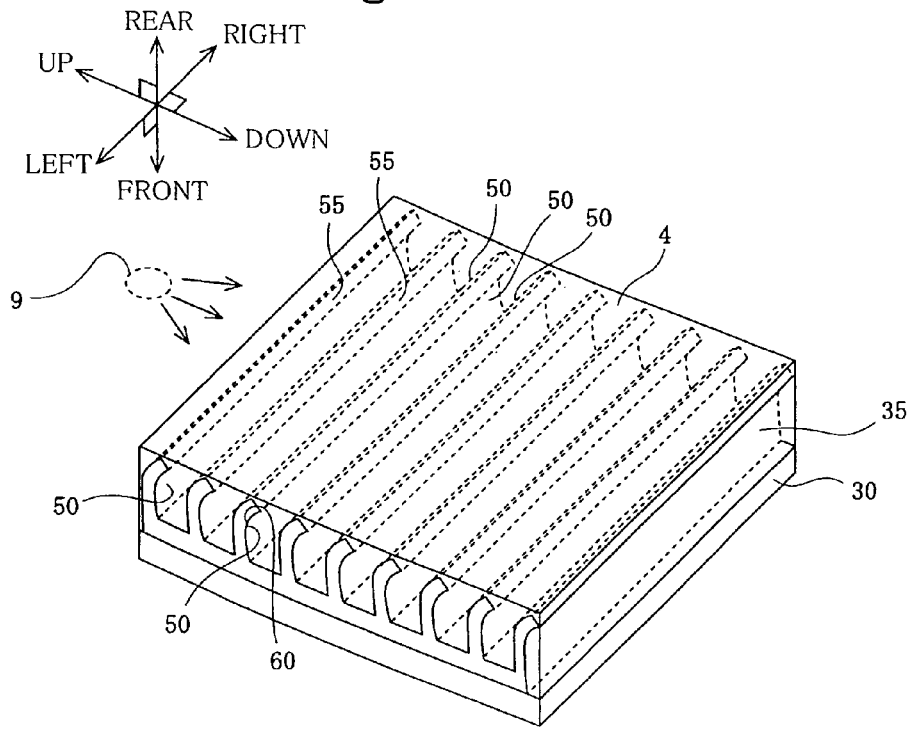
FIG. 6 is a view illustrating the process of manufacturing the radio wave transmission cover according to the second embodiment.

The general construction of a radio wave transmission cover according to a second embodiment of the present invention, with the exception of the shapes of cover-side wall surfaces and substrate-side wall surfaces, remains the same as the radio wave transmission cover according to the first embodiment. The radio wave transmission cover according to the second embodiment includes above mentioned (1), (2) and (4). The method of manufacturing the radio wave transmission cover according to the second embodiment includes above mentioned (8). The process of manufacturing the radio wave transmission cover according to the second embodiment is illustrated in FIGS. 5 and 6. In detail, FIG. 5 illustrates a process of forming an intermediate. FIG. 6 illustrates a process of forming a substrate layer. Hereinafter, in the second embodiment, the terms up, down, left, right, front and rear respectively are defined by up, down, left, right, front and rear shown in FIGS. 5 and 6.

Hereinafter, the method of manufacturing the radio wave transmission cover according to the second embodiment of the present invention will be explained.

(Process of Forming Intermediate: 1. Process of Forming Cover Layer)

A cover layer 3 is formed through the same process as the cover layer forming process of the method of manufacturing the radio wave transmission cover according to the first embodiment. As shown in FIG. 5, a second cover layer 35 has a plurality of depressions 5, formed in the cover layer forming process. Each depression 5 extends in the frontward and rearward directions and in the leftward and rightward directions. An engaging projection part 5', which extends in the frontward and rearward directions and in the leftward and rightward directions, is formed between adjacent depressions 5. Cover-side wall surfaces 50 are defined in each depression 5 by the sidewalls of the corresponding engaging projection parts 5'. The distance between adjacent depressions 5 is less than the width (that is, a length in the frontward and rearward direction) of each depression 5. Therefore, the shortest distance between adjacent cover-side wall surfaces 50, which are defined in each depression 5, corresponds to the width (approximately, 2.0 mm) of the depression 5. The shortest distance between adjacent cover-side wall surfaces 50, which are defined by the opposite sidewalls of each engaging projection part 5', corresponds to the distance (approximately, 0.5 mm) between adjacent depressions 5. As shown in FIG. 5, each cover-side wall surface 50 extends in the frontward and rearward directions and in the leftward and rightward directions.

(Process of Forming Intermediate: 2. Process of Forming Design Layer)

A design layer (not shown) is formed on the rear surface of the cover layer through the same process as the design layer forming process of the method of manufacturing the radio wave transmission cover according to the first embodiment.

(3. Process of Forming Substrate Layer)

A substrate layer 4 is formed on the rear surface of the design layer through the same process as the substrate layer forming process of the method of manufacturing the radio wave transmission cover according to the first embodiment. Here, molten AES resin, which is injected into a third cavity (not shown) through a gate 9 of a fourth mold (not shown), flows in the direction of the arrows of FIG. 6 and is charged into spaces defined between the adjacent cover-side wall surfaces 50.

In the radio wave transmission cover and the method of manufacturing the same according to the second embodiment, the softening temperature of polycarbonate resin, which is the material of the second cover layer 35, is less than the melting point of AES resin, which is the material of the substrate layer 4. Therefore, part of the second cover layer 35 is heated by the molten AES resin and is thus softened. Furthermore, in the second cover layer, parts 55 (the rear ends of the engaging projection parts 5', referred to as partition wall parts), by which the adjacent depressions 5 are sectioned, are bent by the pressure at which molten AES resin flows in the direction (the downward direction of FIG. 6) in which the molten AES resin flows. The cover-side wall surfaces 50, which are defined in the depressions 5 by the sidewalls of the engaging projection parts 5', are also bent. Thus, when the substrate layer forming process is completed, in the radio wave transmission cover (that is, in the radio wave transmission cover of the second embodiment), parts of the cover-side wall surfaces 50 extend in the directions crossing the thicknesswise directions (the frontward and rearward directions of FIG. 6) of the substrate layer 4. Hence, each cover-side wall surface 50 has an undercut shape in the thicknesswise direction of the substrate layer 4. Each substrate-side wall surface 60 also has an undercut shape in the thicknesswise direction of the substrate layer 4. Thereby, in the radio wave transmission cover of the second embodiment, the cover-side wall surfaces 50 and the substrate-side wall surfaces 60 are firmly engaged to each other in the thicknesswise direction of the substrate layer 4. As a result, the radio wave transmission cover of the second embodiment can more reliably prevent the cover layer 3 from being separated from the substrate layer 4.

In the method of manufacturing the radio wave transmission cover according to the second embodiment, at least a portion of each cover-side wall surface 50 is bent by the flowing pressure of resin for the substrate (that is, AES resin). Therefore, the mold for forming the cover-side wall surfaces 50 having undercut shapes does not require a slide core, which is relatively expensive. Hence, in the method of manufacturing the radio wave transmission cover according to the second embodiment, the cover-side wall surfaces 50 having undercut shapes can be easily and inexpensively formed.

Furthermore, in the method of manufacturing the radio wave transmission cover according to the second embodiment, material having a softening point lower than the melting point of resin for the substrate (that is, AES resin) is used as transparent resin (that is, the material of the second cover layer 35, polycarbonate resin). Thus, part of the second cover layer 35 is softened by the heat of molten AES resin. Therefore, the cover-side wall surfaces 50 can be easily bent by the flowing pressure of the molten AES resin. As such, in the process of manufacturing the radio wave transmission cover of the second embodiment, the cover-side wall surfaces 50 can be easily and reliably bent in desired shapes. Accordingly, using the method of manufacturing the radio wave transmission cover of the second embodiment, the radio wave transmission cover, which includes the cover-side wall surfaces 50 having undercut shapes, can be easily and reliably manufactured.

Third Embodiment

Figure 7:
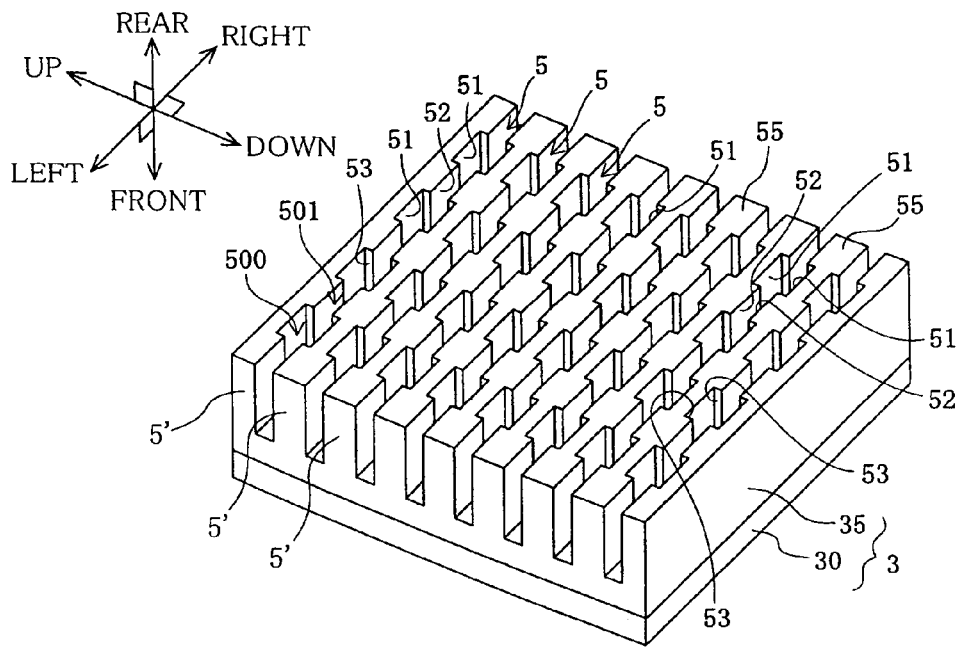
FIG. 7 is a view illustrating a method of manufacturing a radio wave transmission cover, according to a third embodiment of the present invention.
Figure 8:
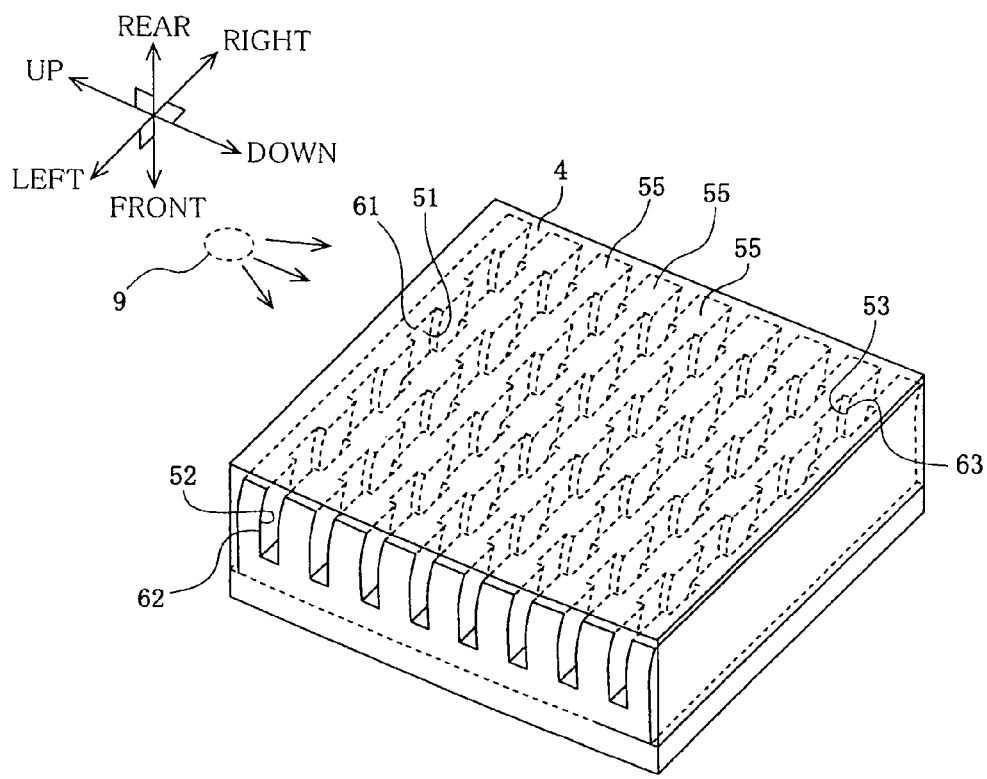
FIG. 8 is a view illustrating the method of manufacturing the radio wave transmission cover according to the third embodiment.

The general construction of a radio wave transmission cover according to a third embodiment of the present invention, with the exception of the shapes of cover-side wall surfaces and substrate-side wall surfaces, remains the same as the radio wave transmission cover according to the first embodiment. The radio wave transmission cover according to the third embodiment includes abovementioned (1) through (4). A method of manufacturing the radio wave transmission cover according to the third embodiment includes above mentioned (8). The process of manufacturing the radio wave transmission cover according to the third embodiment is illustrated in FIGS. 7 and 8. In detail, FIG. 7 illustrates a process of forming an intermediate. FIG. 8 illustrates a process of forming a substrate layer. Hereinafter, in the third embodiment, the terms up, down, left, right, front and rear respectively are defined by up, down, left, right, front and rear shown in FIGS. 7 and 8.

Hereinafter, the method of manufacturing the radio wave transmission cover according to the third embodiment of the present invention will be explained.

(Process of Forming Intermediate: 1. Process of Forming Cover Layer)

A cover layer 3 is formed through the same process as the cover layer forming process of the method of manufacturing the radio wave transmission cover according to the first embodiment. As shown in FIG. 7, a second cover layer 35 has a plurality of depressions 5 through the cover layer forming process. Each depression 5 extends in the frontward and rearward directions and in the leftward and rightward directions. An engaging projection part 5', which protrudes towards a substrate layer 4 and extends in the leftward and rightward directions, is formed between adjacent depressions 5. Each depression 5 includes relatively wide sections (hereinafter, referred to as 'large width sections 500') and relatively narrow sections (hereinafter, referred to as 'small width sections 501'), which consecutively alternate with each other. Each cover-sidewall surface 50, which is formed on each sidewall of the depression 5, includes first cover-side wall surfaces 51, second cover-side wall surfaces 52, and third cover-side wall surfaces 53. Each first cover-side wall surface 51 is formed by each sidewall of the corresponding large width section 500, and extends in the frontward and rearward directions (the first direction) and in the leftward and rightward directions (the second direction). Each second cover-side wall surface 52 is formed by each sidewall of the corresponding small width section 501, and extends in the frontward and rearward directions (the first direction) and in the leftward and rightward directions (the second direction). Each third cover-side wall surface 53 is formed at the boundary between the corresponding large width section 500 and the corresponding small width section 501, and extends in the frontward and rearward directions (the first direction) and in the upward and downward directions (the third direction). As such, the several first cover-side wall surfaces 51, the several second cover-side wall surfaces 52 and the several third cover-side wall surfaces 53 are formed in each depression 5. The distance between adjacent first cover-side wall surfaces 51 is 1.0 mm, the distance between adjacent second cover-side wall surfaces 52 is 0.5 mm, and the distance between adjacent third cover-side wall surfaces 53 is 2.0 mm.

(Process of Forming Intermediate: 2. Process of Forming Design Layer)

A design layer (not shown) is formed on the rear surface of the cover layer through the same process as the design layer forming process of the method of manufacturing the radio wave transmission cover according to the first embodiment.

(3. Process of Forming Substrate Layer)

A substrate layer 4 is formed on the rear surface of the design layer through the same process as the substrate layer forming process of the method of manufacturing the radio wave transmission cover according to the second embodiment. Here, molten AES resin, which is injected into a third cavity (not shown) through a gate 9 of a fourth mold (not shown), flows in the direction of the arrows of FIG. 8, and is charged into spaces defined between the adjacent cover-side wall surfaces 50 (spaces defined between the adjacent first cover-side wall surfaces 51, spaces defined between the adjacent second cover-side wall surfaces 52, and spaces defined between the adjacent third cover-side wall surfaces 53). Part of the second cover layer 35 is heated by molten AES resin and is thus softened. Furthermore, in the second cover layer, partition wall parts 55 (the rear ends of the engaging projection parts 5'), by which the adjacent depressions 5 are sectioned, are bent by the pressure at which molten AES resin flows, in the direction (in the downward direction of FIG. 8) in which the molten AES resin flows. Therefore, the cover-side wall surfaces 51 through 53, which are defined in the depressions 5 by the sidewalls of the engaging projection parts 5', are also bent.

In the radio wave transmission cover of the third embodiment, manufactured through the intermediate forming process and the substrate layer forming process, the cover-side wall surfaces are firmly engaged to the corresponding substrate-side wall surfaces in the thicknesswise direction of the substrate layer 4, in the same manner as that of the radio wave transmission cover of the second embodiment. Hence, the radio wave transmission cover of the third embodiment can reliably prevent the cover layer 3 from being undesirably separated from the substrate layer 4, in the same manner as the radio wave transmission cover of the second embodiment.

Furthermore, in the radio wave transmission cover according to the third embodiment, each of the first cover-side wall surfaces 51 and the second cover-side wall surfaces 52 extends in the leftward and rightward directions (in the second direction), and each third cover-sidewall surface 53 extends in the upward and downward direction (in the third direction). A first substrate-side wall surface 61, which has a shape complementary to each first cover-side wall surface 51, extends in the leftward and rightward directions. A second substrate-side wall surface 62, which has a shape complementary to each second cover-side wall surface 52, also extends in the leftward and rightward directions. A third substrate-side wall surface 63, which has a shape complementary to each third cover-side wall surface 53, extends in the upward and downward directions. Thus, the first cover-side wall surfaces 51 are engaged to the corresponding first substrate-side wall surfaces 61 in the upward and downward directions. The second cover-side wall surfaces 52 are engaged to the corresponding second substrate-side wall surfaces 62 in the upward and downward directions. The third cover-side wall surfaces 53 are engaged to the corresponding third substrate-side wall surfaces 63 in the leftward and rightward directions. Therefore, in the radio wave transmission cover of the third embodiment, the relative positions between the cover layer 3 and the substrate layer 4 are prevented from being displaced from the correct positions relative to two directions, including the upward and downward directions and the leftward and rightward directions. As a result, in the radio wave transmission cover according to the third embodiment, the cover layer 3 can be more reliably prevented from being separated from the substrate layer 4.

The method of manufacturing the radio wave transmission cover according to the third embodiment makes it possible to easily and inexpensively produce the radio wave transmission cover provided with the cover-side wall surfaces 50 having undercut shapes, in the same manner as that of the method of the radio wave transmission cover according to the second embodiment.

Figure 9:
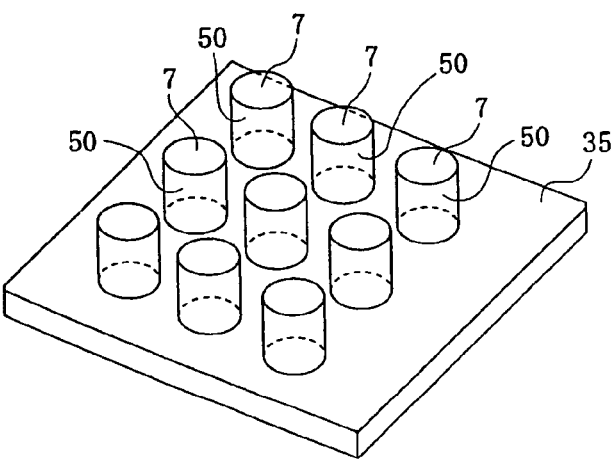
FIG. 9 is an enlarged perspective showing another example of a substrate-side wall surface of the radio wave transmission cover according to the present invention.

In the radio wave transmission covers according to the first through third embodiments, although the cover-side wall surfaces 50 through 53 have been illustrated as being formed in the depressions 5 by the engaging projection parts 5', the shape of the cover-side wall surface of the radio wave transmission cover according to the present invention is not limited to this. For example, as shown in FIG. 9, the present invention may be constructed such that cylindrical engaging projection parts 7 are formed on a second cover layer 35, and such that the circumferential outer surface of each engaging projection part 7 is used as a cover-side wall surface 50.

Figure 10:
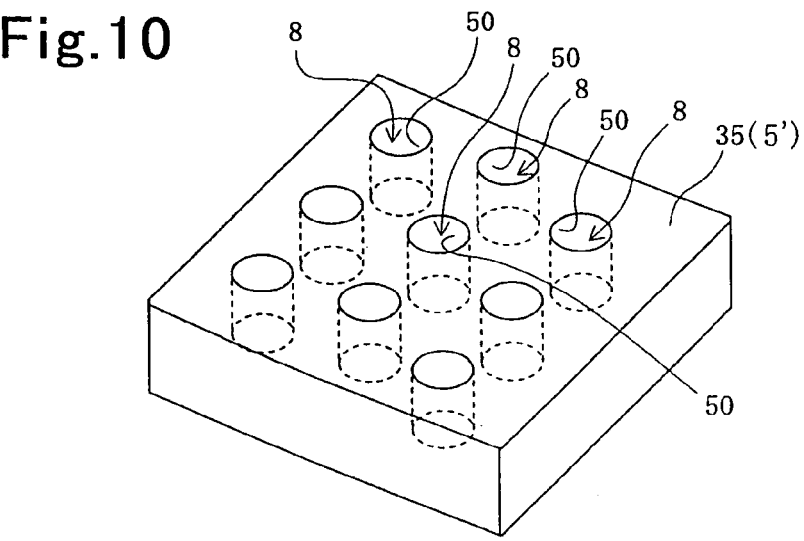
FIG. 10 is an enlarged perspective showing another example of the substrate-side wall surface of the radio wave transmission cover according to the present invention.

Alternatively, as shown in FIG. 10, the present invention may be constructed such that holes 8 are formed in a second cover layer 35, and such that the circumferential inner surface of each hole 8 is used as a cover-side wall surface 50. In this case, a portion of the second cover layer 35 other than the holes 8 corresponds to the engaging projection part 5'.

Figure 11:
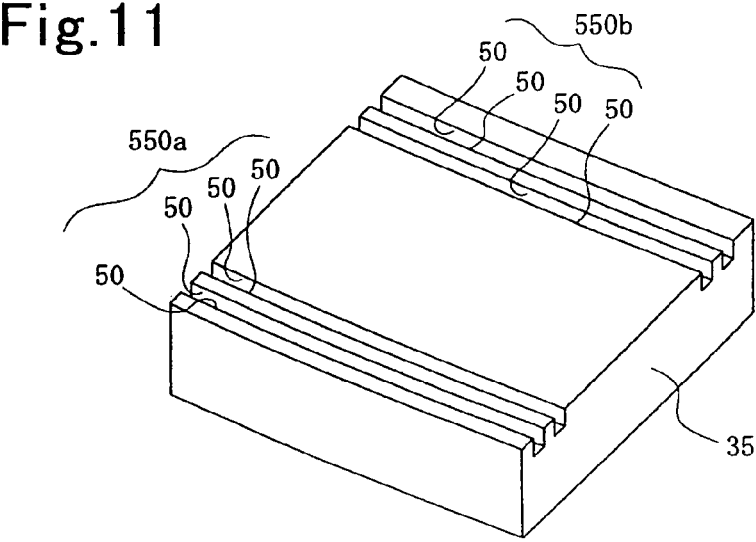
FIG. 11 is an enlarged perspective showing another example of the substrate-side wall surface of the radio wave transmission cover according to the present invention.

As a further alternative, as shown in FIG. 11, the radio wave transmission cover of the present invention may have two or more cover-side wall surface sets 550, each of which includes a plurality of cover-side wall surfaces 50. In this case, the shortest distance between adjacent cover-side wall surfaces 50 denotes the shortest distance between adjacent cover-side wall surfaces 50 of the identical cover-side wall surface set 550a (or 550b).

Fourth Embodiment

Figure 12:
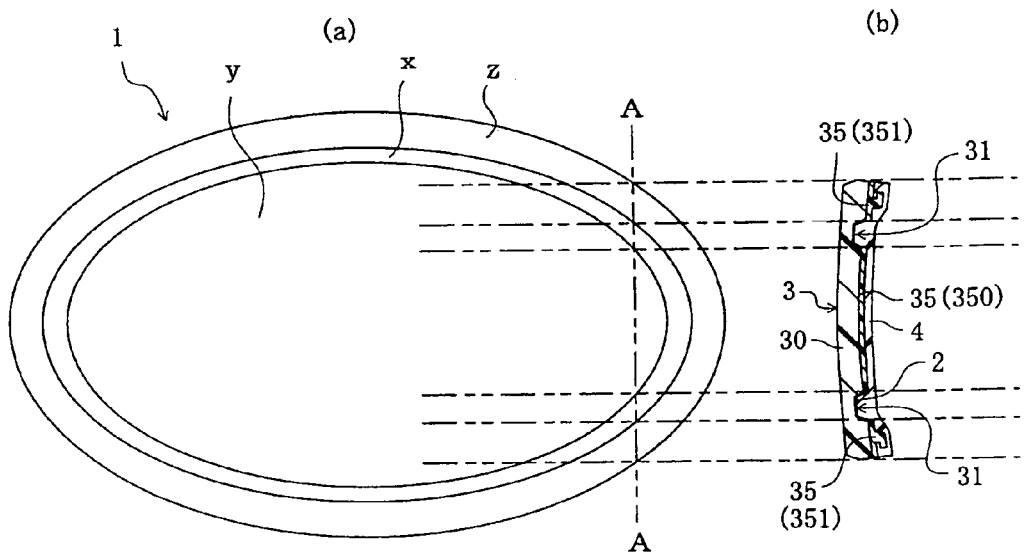
FIG. 12 is views illustrating a radio wave transmission cover, according to a fourth embodiment of the present invention.
Figure 13:
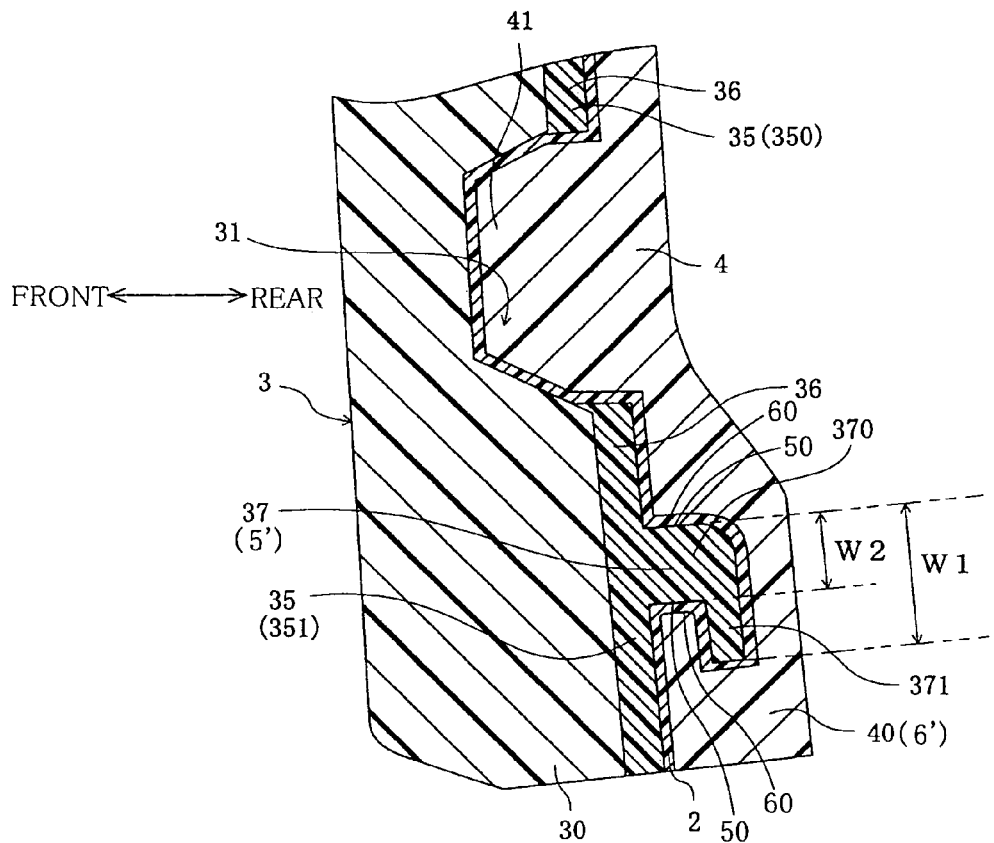
FIG. 13 is an enlarged view showing a main part of FIG. 12b.

FIG. 12 illustrates a radio wave transmission cover, according to a fourth embodiment of the present invention. FIG. 12(a) shows a front view of the radio wave transmission cover according to the fourth embodiment. FIG. 12(b) is a sectional view taken along the line A-A of FIG. 12(a), showing the radio wave transmission cover according to the fourth embodiment. FIG. 13 is an enlarged view showing a main part of FIG. 12(b). Hereinafter, in the fourth embodiment, the terms front and rear respectively are defined by front and rear shown in FIG. 13.

As shown in FIG. 12(a), the radio wave transmission cover 1 of the fourth embodiment has an approximately elliptical plate shape. As shown in FIGS. 12(b) and 13, the radio wave transmission cover 1 includes a design layer 2, a cover layer 3, which covers the front surface of the design layer 2, and a substrate layers 4, which covers the rear surface of the design layer 2.

The cover layer 3 includes a first cover layer 30 and a second cover layer 35, which are formed in multiple colors. The first cover layer 30 is made of polycarbonate resin, which is a kind of transparent resin, and is thus transparent. A portion of the rear surface of the first cover layer 30 is depressed to have a ring shape. In the radio wave transmission cover 1 of the fourth embodiment, the interior of the ring-shaped depressed portion forms a window part 31.

The second cover layer 35 is made of a mixture of polycarbonate resin and carbon black, and is black. On the rear surface of the first cover layer 30, the second cover layer 35 is formed inside the inner circumference of the window part 31 and outside the outer circumference of the window part 31. In other words, the second cover layer 35 covers portions of the rear surface of the first cover layer 30 other than the window part 31. The portion of the second cover layer 35 that covers the portion of the rear surface of the first cover layer 30, which is disposed inside the inner circumference of the window part 31, is designated an inside second cover layer 350. The portion of the second cover layer 35 that covers the portion of the rear surface of the first cover layer 30, which is disposed outside the outer circumference of the window part 31, is designated an outside second cover layer 351.

As shown in FIG. 13, the outside second cover layer 351 includes a planar part 36 and a cover-side engaging part 37. The planar part 36 is a part adjacent to the first cover layer 30. The cover-side engaging part 37 (corresponding to the engaging projection part 5' of the first embodiment) protrudes from the rear surface of the planar part 36. The cover-side engaging part 37 has an undercut shape, in which part thereof is cut with respect to the thickness direction of the radio wave transmission cover 1. In detail, the cover-side engaging part 37 is disposed outside the outer circumference of the window part 31, and extends in the circumferential direction of the radio wave transmission cover 1. The cover-side engaging part 37 includes a cylindrical wall part 370, which protrudes from the rear surface of the planar part 36, and a hook part 371, which is provided on the protruding end of the cylindrical wall part 370. The radial length W1 of the hook part 371 is greater than the radial length W2 of the cylindrical wall part 370. The inside second cover layer 350 includes only the planar part 36. The outside second cover layer 351 includes the planar part 36 and the cover-side engaging part 37. In the drawings, the reference numeral 50 corresponds to the cover-side wall surface of the first embodiment.

The design layer 2 is formed by vapor-depositing indium on the rear surface of the cover layer 3. As shown in FIG. 13, the design layer 2 covers both the rear surface of the second cover layer 35 and the inner surface of the window part 31 of the first cover layer 30.

The substrate layer 4 is made of AES resin. The melting point of AES resin is lower than that of polycarbonate resin. The substrate layer 4 covers the entire rear surface of the cover layer 3, such that the design layer 2 is interposed between the substrate layer 4 and the cover layer 3. The substrate layer 4 includes a substrate-side engaging part 40 (corresponding to the engaging depressed part 6' of the first embodiment), which is engaged to the cover-side engaging part 37. The substrate-side engaging part 40 has an undercut shape, complementary to the cover-side engaging part 37. In the substrate layer 4, a portion, which is disposed behind the window part 31, forms a ring-shaped window charging part 41, which forms a protrusion structure. The window charging part 41 is inserted into the window part 31 in a state in which the design layer 2 is interposed therebetween. In the drawings, the reference numeral 60 corresponds to the substrate-side wall surface.

Below, a method of manufacturing the radio wave transmission cover 1 according to the fourth embodiment of the present invention will be described.

(1. Process of Forming Cover Layer)

A first mold (not shown), for forming the front surface of the first cover layer 30, a second mold (not shown), for forming the rear surface of the first cover layer 30, and a third mold (not shown), for forming the rear surface of the second cover layer 35, are prepared. Thereafter, the second mold is engaged to the first mold, such that a first cavity is defined between the mold surface of the first mold and the mold surface of the second mold. Molten polycarbonate resin is injected into the first cavity, thus forming the first cover layer 30. After the first cover layer 30 has been formed, the second mold is replaced with the third mold. Then, a second cavity is defined between the mold surface of the first mold, the rear surface of the first cover layer 30, which remains in the first mold, and the mold surface of the third mold. A molten mixture of molten polycarbonate resin and carbon black is injected into the second cavity, thus forming the second cover layer 35 on the rear surface of the first cover layer 30. Through this cover layer forming process, the cover layer 3, which is formed by forming the first cover layer 30 and the second cover layer 35 in multiple colors (in the fourth embodiment, in two colors), is obtained.

(2. Process of Forming Design Layer)

The front surface and the side surface of the cover layer 3, which is formed through the cover layer forming process, are masked. Thereafter, indium is vapor-deposited onto the rear surface of the cover layer 3, thus forming the design layer 2. Then, an intermediate of the radio wave transmission cover, which includes the cover layer 3 and the design layer 2, is obtained by completing the design layer forming process.

(3. Process of Forming Substrate Layer)

A fourth mold (not shown) for forming the rear surface of the substrate layer 4, is prepared. The intermediate, which is obtained by completing the design layer forming process, is placed in the first mold. Thereafter, the fourth mold is engaged to the first mold such that a third cavity is defined between the mold surface of the first mold, the rear surface of the intermediate, which is placed in the first mold, and a mold surface of the fourth mold. Subsequently, molten AES resin is injected into the third cavity, thus forming the substrate layer 4 on the rear surface of the design layer 2. As a result, the radio wave transmission cover, which includes the cover layer 3, the design layer 2, and the substrate layer 4, is obtained through the above-mentioned processes.

In the radio wave transmission cover 1 according to the fourth embodiment, the cover-side engaging part 37, formed on the cover layer 30 is mechanically engaged to the substrate-side engaging part 40 formed on the substrate layer 4. Therefore, despite the structure such that the cover layer 3 and the substrate layer 4 are made of materials having different melting points, the cover layer 3 and the substrate layer 4 can be firmly integrated with each other.

Furthermore, in the radio wave transmission cover 1 according to the fourth embodiment, material having a melting point lower than that of the material of the cover layer 3 is used as the material of the substrate layer 4. In this case, when forming the substrate layer 4, the cover layer 3 and the design layer 2 are prevented from being deformed. Therefore, the radio wave transmission cover 1 of the fourth embodiment ensures a superior design.

In addition, the main material of the second cover layer 35 is the same transparent resin as the material of the first cover layer 30, and the first cover layer 30 and the second cover layer 35 are formed in multiple colors. Therefore, the first cover layer 30 and the second cover layer 35 are partially compatible with each other, so that they can be firmly integrated with each other. In addition, because the second cover layer 35 is colored (in black) and the cover-side engaging part 37 is formed on the second cover layer 35, the cover-side engaging part 37 and its periphery (the circumferential outer edge of the outside second cover layer 351, that is, the lower part of FIG. 13) can serve as a mask layer. Accordingly, despite having the cover-side engaging part 37 having the undercut shape, the radio wave transmission cover 1 of the fourth embodiment can overcome the design restriction attributable to the cover-side engaging part 37. That is, the radio wave transmission cover 1 of the fourth embodiment has a high degree of freedom in design.

As shown in FIG. 12(a), when seen in the front view of the radio wave transmission cover 1 of the fourth embodiment, the color of the metal which is derived from the design layer 2 is expressed through the interior x of the window part 31. The portion y inside the inner circumference of the window part 31 and the portion z outside the outer circumference thereof are expressed in black, derived from the second cover layer 35. In other words, in the radio wave transmission cover 1 of the fourth embodiment, the portions expressed in black are portions derived from the design layer 2. Thus, the portion y inside the inner circumference of the window part 31 and the portion z outside the outer circumference thereof are expressed in a single black color. Therefore, in the radio wave transmission cover 1 of the fourth embodiment, the portions other than the window part 31 have superior integrity. As a result, the radio wave transmission cover 1 of the fourth embodiment can have amore superior design.

Furthermore, in the radio wave transmission cover 1 of the fourth embodiment, although the inside second cover layer 350 and the outside second cover layer 351 have been illustrated as being made of the same mixture material, they may be made of different mixture materials. For example, the inside second cover layer 350 may be made of a mixture of polycarbonate resin and some colorant other than carbon black. In this case, the inside second cover layer 350 can be formed in a color different from that of the outside second cover layer 351. As well, the portion y inside the inner circumference of the window part 31 is expressed in a single color derived from the inside second cover layer 350, and the portion z outside the outer circumference of the window part 31 is expressed in a single color derived from the outer second cover layer 351. Therefore, each of the portion y, inside the inner circumference of the window part 31, and the portion z, outside the outer circumference of the window part 31, has superior integrity.

Meanwhile, the outer circumferential part of the radio wave transmission cover 1 is disposed away from the path along which radio waves are input into or output from the radio radar device. Therefore, the radio wave transmission cover 1 of the fourth embodiment ensures superior transmissibility, even though it is constructed such that the outer circumferential part thereof is thicker than the inner circumferential part thereof.

Fifth Embodiment

Figure 14:
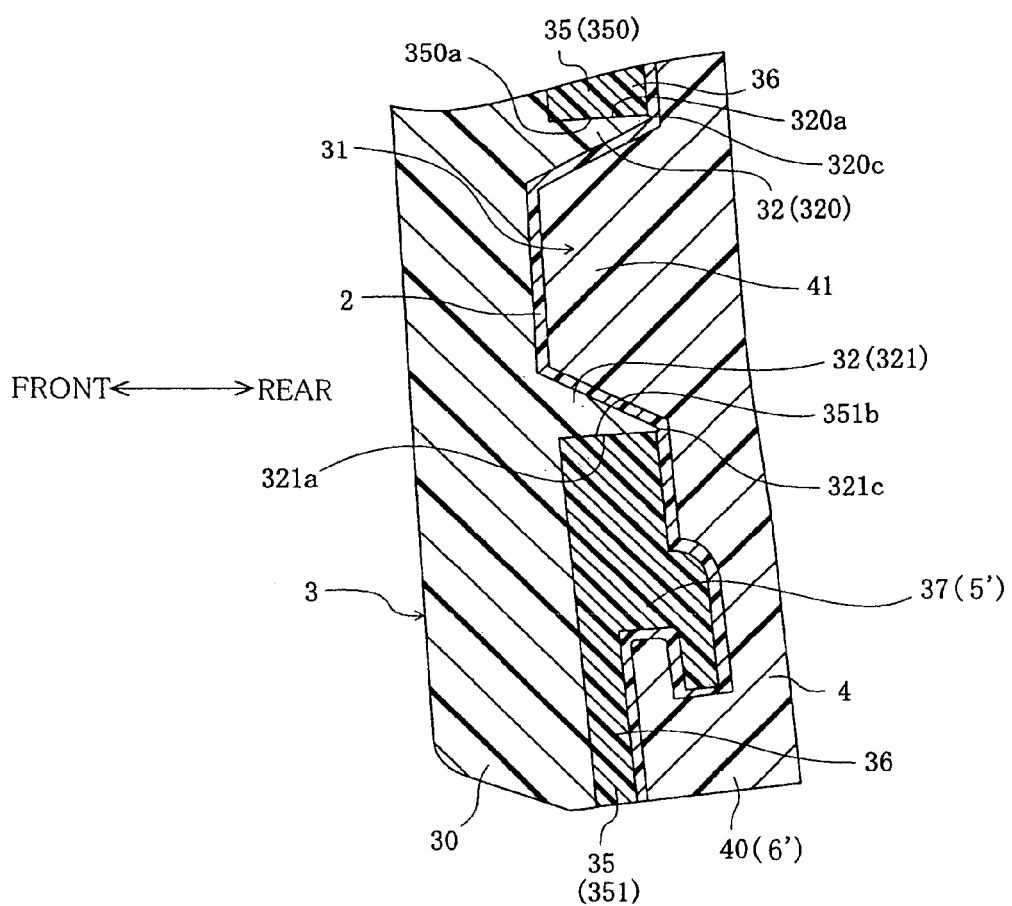
FIG. 14 is views showing a main part of a radio wave transmission cover, according to a fifth embodiment of the present invention.
Figure 15:
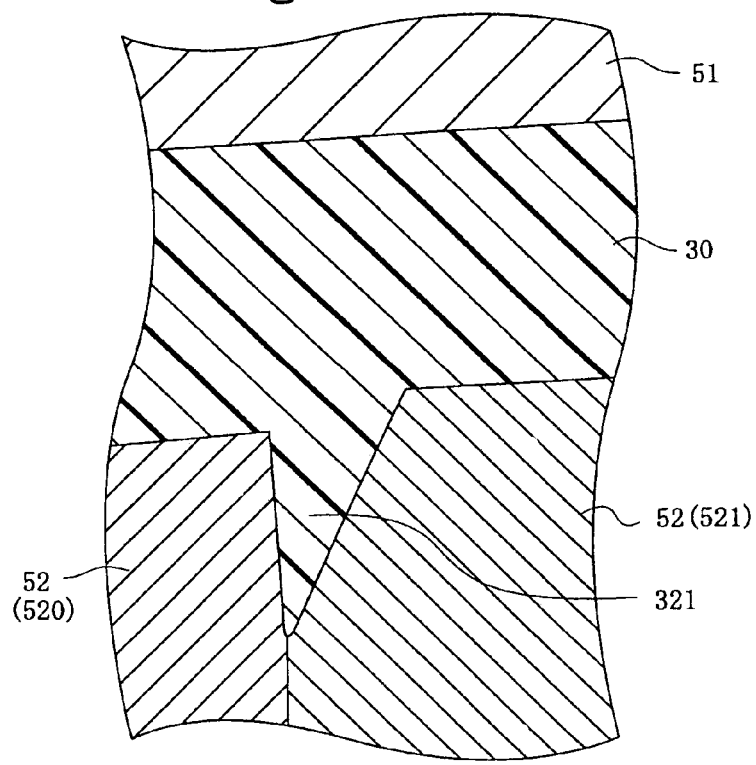
FIG. 15 is a view illustrating a process of manufacturing a cover layer of the radio wave transmission cover according to the fifth embodiment.
Figure 16:
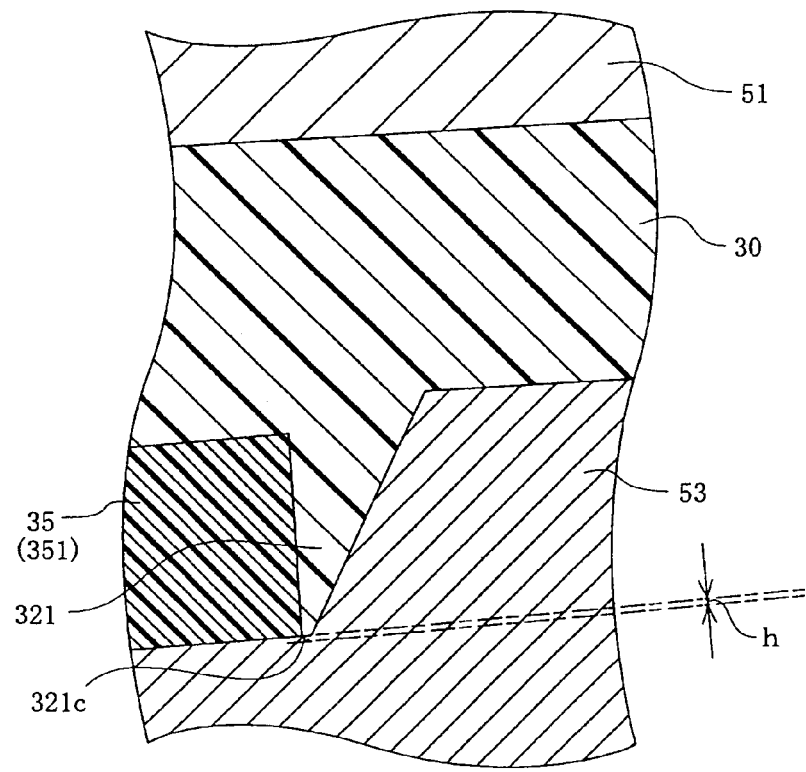
FIG. 16 is a view illustrating the process of manufacturing the cover layer of the radio wave transmission cover according to the fifth embodiment.

A radio wave transmission cover according to a fifth embodiment of the present invention includes above mentioned (7). FIG. 14 illustrates a main part of the radio wave transmission cover according to the fifth embodiment. FIGS. 15 and 16 illustrate a process of forming a cover layer of the radio wave transmission cover according to the fifth embodiment. Furthermore, FIG. 14 is an enlarged sectional view of the main part of the radio wave transmission cover of the fifth embodiment, corresponding to the sectional view taken along the line A-A of FIG. 12(a). Hereinafter, in the fifth embodiment, the terms front and rear respectively are defined by front and rear shown in FIG. 14.

The radio wave transmission cover of the fifth embodiment has an approximately elliptical plate shape, in the same manner as that of the radio wave transmission cover 1 of the fourth embodiment. The cover layer 3 is formed by forming a first cover layer 30, which is made of polycarbonate resin, and a second cover layer 35, which is made of a mixture of polycarbonate resin and carbon black, in multiple colors (two colors).

The first cover layer 30 has two parting parts 32, which protrude in the rearward direction. Each of the two parting parts 32 forms a wall which protrudes to have a ring shape. A first parting part 320, which is one of the two parting parts 32, is formed inside a second parting part 32, which is a remaining one of the two parting parts 32.

The second cover layer 35 is formed on the rear surface of the first cover layer 30, both at a position inside the inner circumference of the first parting part 320 and at a position outside the outer circumference of the second parting part 321. In the second cover layer 35, an inside second cover layer 350, which is formed inside the inner circumference of the first parting part 320, includes only a planar part 36. An outside second cover layer 351, which is formed outside the outer circumference of the second parting part 321, includes a planar part 36 and a cover-side engaging part 37 (an engaging projection part 5'). The cover-side engaging part 37 has an undercut shape, in which part thereof is cut with respect to the thickness direction of the radio wave transmission cover, in the same manner as that of the radio wave transmission cover of the fourth embodiment.

As shown in FIG. 14, the circumferential outer surface 350a of the inside second cover layer 350 is in contact with the circumferential inner surface 320a of the first parting part 320. The circumferential inner surface 351b of the outside second cover layer 351 is in contact with the circumferential outer surface 321a of the second parting part 321. In the first cover layer 30 of the radio wave transmission cover of the fifth embodiment, the portion between the circumferential inner surface 320a of the first parting part 320 and the circumferential outer surface 321a of the second parting part 321 corresponds to the window part 31 of the present invention.

A tip part 320c of the first parting part 320 protrudes from the circumferential outer edge of the inside second cover layer 350 in the rearward direction. A tip part 321c of the second parting part 321 protrudes from the circumferential inner edge of the outside second cover layer 351 in the rearward direction.

The design layer 2 is formed by vapor-depositing indium on the rear surface of the cover layer 3. The design layer 2 covers both the rear surface of the second cover layer 35 and the inner surface of the window part 31 of the first cover layer 30.

The substrate layer 4 is made of AES resin and covers the entire rear surface of the cover layer 3, such that the design layer 2 is interposed between the substrate layer 4 and the cover layer 3. The substrate layer 4 includes a substrate-side engaging part 40, which is engaged to the cover-side engaging part 37. The substrate-side engaging part 40 (corresponding to the engaging depressed part 6') has an undercut shape which complements the cover-side engaging part 37. Furthermore, in the substrate layer 4, a portion, which is disposed behind the window part 31, forms a ring-shaped window charging part 41. The window charging part 41 is inserted into the window part 31 in a state in which the design layer 2 is interposed therebetween.

Below, a method of manufacturing the cover layer 3 of the radio wave transmission cover according to the fifth embodiment of the present invention will be described.

As shown in FIGS. 15 and 16, a first mold 51 for forming the front surface of the first cover layer 30, a second mold 52 for forming the rear surface of the first cover layer 30, and a third mold 53 for forming the rear surface of the second cover layer 35 are prepared. The second mold 52 includes two mold bodies 520 and 521, which are separated from each other based on the tip part 320c, 321c of the parting part 32.

As shown in FIG. 15, a first cavity is defined between the first mold 51 and the second mold 52. Molten polycarbonate resin is injected into the first cavity, thus forming the first cover layer 30. After the first cover layer 30 has been formed, the second mold 52 is replaced with the third mold 53, as shown in FIG. 16. Then, a second cavity is defined between the mold surface of the first mold 51, the rear surface of the first cover layer 30, which remains in the first mold 51, and the mold surface of the third mold 53.

As described above, the first cover layer 30 has the first parting part 320 and the second parting part 321. The tip part 320c of the first parting part 320 protrudes from the circumferential outer edge of the inside second cover layer 350 in the rearward direction. The tip part 321c of the second parting part 321 protrudes from the circumferential inner edge of the outside second cover layer 351 in the rearward direction. Therefore, the tip part 320c(not shown) of the first parting part 320 and the tip part 321c of the second parting part 321 are brought into contact with the mold surface of the third mold 53 under pressure, thus being firmly supported by the mold surface of the third mold 53 (see, FIG. 16).

In the state where the tip part 320c of the first parting part 320 and the tip part 321c of the second parting part 321 forcibly contact the mold surface of the third mold 53, a molten mixture of molten polycarbonate resin and carbon black is inserted, thus forming the second cover layer 35 on the rear surface of the first cover layer 30.

In the radio wave transmission cover according to the fifth embodiment, the cover-side engaging part 37, formed on the cover layer 3, is mechanically engaged to the substrate-side engaging part 40 formed on the substrate layer 4, in the same manner as the radio wave transmission cover of the fourth embodiment. Therefore, in the radio wave transmission cover of fifth embodiment, even though the cover layer 3 and the substrate layer 4 are formed using materials having different melting points, the cover layer 3 can be firmly integrated with the substrate layer 4.

Furthermore, because the melting point of the material of the substrate layer 4 is lower than that of the material of the cover layer 3, when the substrate layer 4 is formed, the cover layer 3 or the design layer 2 is prevented from being deformed. Therefore, the radio wave transmission cover of the fifth embodiment can ensure a superior design.

In addition, because the cover-side engaging part 37 is formed on the second cover layer 35, which is black, the cover-side engaging part 37 and the surroundings thereof can serve as a mask layer. Accordingly, despite having the cover-side engaging part 37 having the undercut shape, the radio wave transmission cover of the fifth embodiment can overcome the restriction in design attributable to the cover-side engaging part 37. That is, the radio wave transmission cover of the fifth embodiment has a high degree of freedom in design. As well, the first cover layer 30 and the second cover layer 35 are formed in multiple colors, and the main material of the second cover layer 35 is the same transparent resin as the material of the first cover layer 30. Therefore, the first cover layer 30 and the second cover layer 35 are can be firmly integrated with each other.

In the radio wave transmission cover of the fifth embodiment, portions other than the window part 31 are expressed in black, which is derived from the second cover layer 35, in the same manner as the radio wave transmission cover of the fourth embodiment. Therefore, in the radio wave transmission cover of the fifth embodiment, the portions other than the window part 31 have superior integrity. As a result, the radio wave transmission cover of the fifth embodiment can have a superior design.

The window part 31 of the first cover layer 30 has the first parting part 320 at the boundary between it and the inside second cover layer 350, and has the second parting part 321 at the boundary between it and the outside second cover layer 351. Each of the first parting part 320 and the second parting part 321 has the protruding wall shape. The tip part 320c of the first parting part 320 protrudes from the circumferential outer edge of the inside second cover layer 350 in the rearward direction. The tip part 321c of the second parting part 321 protrudes from the circumferential inner edge of the outside second cover layer 350 in the rearward direction. When the second cover layer 35 is formed, the tip part 320c of the first parting part 320 and the tip part 321c of the second parting part 321 are brought into close contact with the mold surface of the third mold 53 under pressure. Hence, the first parting part 320 and the second parting part 321 are reliably supported by the mold surface of the third mold 53. As such, because the parting parts 32 are stably supported, even if the first cover layer 30 is contracted after being formed, the boundary line between the window part 31 of the first cover layer 30 and the second cover layer 35 is prevented from being displaced from the correct position. The radio wave transmission cover of the fifth embodiment can ensure a more superior design.

In the tip part 320c of the first parting part 320 of the radio wave transmission cover according to the fifth embodiment, a part (not shown) which protrudes from the circumferential outer edge of the inside second cover layer 350 in the rearward direction is compressed and thus bent by the mold surface of the third mold 53 when forming the second cover layer 35. Furthermore, in the tip part 321c of the second parting part 321, a part (designated by the character h of FIG. 16) which protrudes from the circumferential inner edge of the outside second cover layer 351 in the rearward direction is also compressed and bent by the mold surface of the third mold 53. However, when the intermediate of the radio wave transmission cover, which consists of the first cover layer 30 and the second cover layer 35, is removed from the molds 51 and 53, the tip part 320c of the first parting part 320 and the tip part 321c of the second parting part 321 are restored to the original state thereof by their own elasticity. Therefore, in the radio wave transmission cover, the tip part 320c of the first parting part 320 slightly protrudes from the circumferential outer edge of the inside second cover layer 350 in the rearward direction. The tip part 321c of the second parting part 321 slightly protrudes from the circumferential inner edge of the outside second cover layer 351 in the rearward direction. Furthermore, in the radio wave transmission cover of the present invention, the height to which the tip part of the parting part protrudes from the first cover layer may be the same as the height of a portion of the second cover layer, which is in contact with the parting part.

Meanwhile, to further enhance the design of the radio wave transmission cover, it is preferable that the tip part of each parting part 32 be relatively thin. In other words, preferably, the tip part of the parting part 32 has a pointed shape. The reason for this is that portions which are derived from the parting parts 32 and are expressed on the front surface of the radio wave transmission cover can be reduced by the pointed shape of the tip part.

In the radio wave transmission cover according to the fifth embodiment, almost all parts of the second cover layer 35 are disposed in front of the parting parts 32. In other words, in the radio wave transmission cover of the fifth embodiment, the first cover layer 30 has a receiving depression, which is formed by depressing a portion thereof. Part of the second cover layer 35 relative to the thicknesswise direction is received in the receiving depression. Therefore, compared to the radio wave transmission cover of the fourth embodiment, the radio wave transmission cover of the fifth embodiment can be relatively thin. As a result, the radio wave transmission cover of the fifth embodiment is light and can be produced at a relatively low cost.

While the invention has been shown and described with respect to the preferred embodiments, it will be understood by those skilled in the art that various changes and modifications may be made without departing from the spirit and scope of the invention, as defined in the following claims.

What is claimed is:

1. A radio wave transmission cover for providing in front of a radar device for vehicles, comprising:
    a design layer, the design layer having a front surface and a rear surface opposite to the front surface;
    a cover layer that covers the front surface of the design layer, the cover layer having a plate shape and having a rear surface facing the design layer and a front surface opposite to the rear surface; and
    a substrate layer that covers the rear surface of the design layer, the substrate layer having a plate shape,
    wherein the cover layer comprises a first cover layer that includes a transparent resin material, and a second cover layer for covering a portion of the first cover layer, the second cover layer being made of a mixture of the transparent resin material and a colorant, the second cover layer having a rear surface facing the design layer and a front surface opposite to the rear surface;
    wherein the design layer is formed on the rear surface of the cover layer by vapor-depositing metal, the design layer being positioned between the cover layer and the substrate layer;
    wherein the second cover layer comprises a plurality of engaging projection parts each of which has a plurality of cover-side wall surfaces extending in a frontward to a rearward direction;
    wherein the substrate layer is made of a resin material having a melting point different from the melting point of the transparent resin material, and comprises a plurality of engaging depression parts, each of which has a plurality of substrate-side wall surfaces having shapes complementary to the shapes of the plurality of cover-side wall surfaces;
    wherein the plurality of engaging projection parts are engaged to the plurality of engaging depression parts;
    wherein each of the plurality of cover-side wall surfaces engages with each of the plurality of substrate-side wall surfaces at the plurality of engaging depression parts.

2. The radio wave transmission cover according to claim 1, wherein the distance between adjacent cover-side wall surfaces of adjacent engaging projection parts of the second cover layer is 0.5 mm or less.

3. The radio wave transmission cover according to claim 1, wherein at least one of the plurality of cover-side wall surfaces extends both in a first direction across the rear surface of the second cover layer, and in a second direction perpendicular to the first direction; and
    wherein at least another one of the plurality of cover-side wall surfaces extends both in the first direction, the second direction and in a third direction perpendicular to the second direction and the first direction.

4. The radio wave transmission cover according to claim 1, wherein at least one dimension of each of the substrate layer and the second cover layer is longer than any other dimension of each of the substrate layer and the second cover layer; and
    wherein at least one of the plurality of cover-side wall surfaces extends both in a first direction across the rear surface of the second cover layer, and in a second direction across a lengthwise direction of at least one of the substrate layer and the second cover layer.

5. The radio wave transmission cover according to claim 1, wherein each of the plurality of engaging projection parts has an undercut shape; and
    wherein the first cover layer has a rear surface facing the second cover layer and a front surface opposite to the rear surface, the second cover layer comprises a planar part disposed adjacent to the rear surface of the first cover layer, the planar part having a rear surface, from which the engaging projection parts protrude.

6. The radio wave transmission cover according to claim 5, wherein the second cover layer is formed on the first cover layer;
    wherein a portion of the rear surface of the first cover layer which is free from a remaining portion covered with the second cover layer forms a window part, the window part having a parting part at a boundary between the window part and the second cover layer, the parting part having a wall shape; and
    wherein a tip part is a portion of the parting part that protrudes from a portion of the second cover layer that is adjacent to the parting part, in direction away from the front surface of the second cover layer.

7. A method of manufacturing the radio wave transmission cover according to claim 1, comprising:
    forming an intermediate having the cover layer and the design layer; and
    forming the substrate layer by applying a molten resin material for the substrate layer onto a rear surface of the intermediate,
    wherein in the forming the substrate layer, at least one of the cover-side wall surfaces is bent by a flow pressure of the resin material of the substrate layer.

8. The method according to claim 7, wherein a softening temperature of the transparent resin material is lower than a melting temperature of the resin material of the substrate layer; and
    wherein in the forming the substrate layer, at least one of the cover-side wall surfaces is bent as at least a part of the second cover layer is softened.

9. The radio wave transmission cover according to claim 2, wherein at least one of the plurality of cover-side wall surfaces extends both in a first direction across the rear surface of the second cover layer, and in a second direction perpendicular to the first direction; and
    wherein at least another one of the plurality of cover-side wall surfaces extends both in the first direction, the second direction and in a third direction perpendicular to the second direction and the first direction.

10. The radio wave transmission cover according to claim 1, wherein at least one of the plurality of cover-side wall surfaces extends both in a first direction across the rear surface of the second cover layer, and in a second direction across the first direction; and
    wherein at least another one of the plurality of cover-side wall surfaces extends both in the first direction, the second direction and in a third direction perpendicular to the second direction and the first direction.

11. The radio wave transmission cover according to claim 2, wherein at least one dimension of each of the substrate layer and the second cover layer is longer than any other dimension of each of the substrate layer and the second cover layer; and wherein at least one of the plurality of cover-side wall surfaces extends both in a first direction across the rear surface of the second cover layer, and in a second direction across a lengthwise direction of at least one of the substrate layer and the second cover layer.

12. The radio wave transmission cover according to claim 3, wherein at least one dimension of each of the substrate layer and the second cover layer is longer than any other dimension of each of the substrate layer and the second cover layer; and wherein at least one of the plurality of cover-side wall surfaces extends both in a first direction across the rear surface of the second cover layer, and in the second direction across a lengthwise direction of at least one of the substrate layer and the second cover layer.

13. The radio transmission cover according to claim 1, wherein at least one of the engaging projection parts is bent.

14. A radio wave transmission cover for providing in front of a radar device for vehicles, prepared by a process comprising the steps of:

providing a design layer, the design layer having a front surface and a rear surface opposite to the front surface;

providing a cover layer that covers the front surface of the design layer, the cover layer having a plate shape and having a rear surface facing the design layer and a front surface opposite to the rear surface;

providing a substrate layer that covers the rear surface of the design layer, the substrate layer having a plate shape, the substrate layer having a front surface facing the design layer and a rear surface opposite to the front surface;

forming an intermediate having the cover layer and the design layer, the intermediate layer having a front surface and a rear surface opposite to the front surface; and forming the substrate layer by applying a molten resin material for the substrate layer onto the rear surface of the intermediate;

wherein the cover layer comprises a first cover layer that includes a transparent resin material, and a second cover layer for covering a portion of the first cover layer, the second cover layer being made of a mixture of the transparent resin material and a colorant, the second cover layer having a rear surface facing the design layer and a front surface opposite to the rear surface;

wherein the design layer is formed on the rear surface of the cover layer by vapor-depositing metal, the design layer being positioned between the cover layer and the substrate layer;

wherein the second cover layer comprises a plurality of engaging projection parts each of which has a plurality of cover-side wall surfaces extending in a frontward to a rearward direction;

wherein the substrate layer is made of a resin material having a melting point different from the melting point of the transparent resin material, and comprises a plurality of engaging depression parts, each of which has a plurality of substrate-side wall surfaces having shapes complementary to the shapes of the plurality of cover-side wall surfaces;

wherein the plurality of engaging projection parts are engaged to corresponding ones of the plurality of engaging depression parts;

wherein each of the plurality of cover-side wall surfaces engages with each of the plurality of substrate-side wall surfaces of the substrate at the plurality of engaging depression parts;

wherein in the forming the substrate layer, at least one of the plurality of cover-side wall surfaces is bent by a flow pressure of the resin material of the substrate layer; and wherein at least a portion of at least one of the plurality of cover-side wall surfaces extends in the same direction as the direction from the front surface of the substrate layer to the back surface of the substrate layer.

15. The radio wave transmission cover according to claim 14, wherein the softening temperature of the transparent resin material is lower than a melting temperature of the resin material of the substrate layer; and wherein in the forming the substrate layer, at least one of the engaging projection parts is bent as at least a part of the second cover layer is softened.

16. The radio wave transmission cover according to claim 1, wherein the engaging projection parts are bent by a flow pressure of the resin material of the substrate.

* * * * *